US012663803B2

(12) United States Patent　　(10) Patent No.:　US 12,663,803 B2
Manohar et al.　　(45) Date of Patent:　Jun. 23, 2026

(54) UNMANNED AERIAL SYSTEM PATH OPTIMIZATION BASED ON MACHINE LEARNING

(71) Applicant: Phoenix AI LLC, Sunnyvale, CA (US)

(72) Inventors: Vignesh Manohar, Acton (CA); Craig Kleski, Los Angeles, CA (US); Rajesh Rasalkar, Naperville, IL (US); Riten Gupta, Los Angeles, CA (US); Raj Sengupta, Bethesda, MD (US)

(73) Assignee: Phoenix AI LLC, Sunnyvale, CA (US)

( * ) Notice: Subject to any disclaimer, the term of this patent is extended or adjusted under 35 U.S.C. 154(b) by 63 days.

(21) Appl. No.: 18/751,055

(22) Filed: Jun. 21, 2024

(65) Prior Publication Data

US 2024/0427346 A1　　Dec. 26, 2024

Related U.S. Application Data

(60) Provisional application No. 63/509,651, filed on Jun. 22, 2023.

(51) Int. Cl.
　G05D 1/247　　(2024.01)
　G05D 101/15　　(2024.01)
(52) U.S. Cl.
　CPC ......... G05D 1/247 (2024.01); G05D 2101/15 (2024.01)
(58) Field of Classification Search
　CPC ....... G05D 1/247; G01C 21/20; H04W 16/02; H04W 24/08; H04W 72/56; H04W 36/08
　See application file for complete search history.

(56) References Cited

U.S. PATENT DOCUMENTS

| | | | | |
|---|---|---|---|---|
| 8,488,574 B2 * | 7/2013 | Kim | ...................... | H04W 36/08 |
| | | | | 370/328 |
| 2023/0071539 A1 * | 3/2023 | Dijkstra | ................ | H04W 16/02 |
| 2023/0422287 A1 * | 12/2023 | Li | ......................... | H04W 72/56 |

FOREIGN PATENT DOCUMENTS

| | | | | |
|---|---|---|---|---|
| CN | 109506654 B | * 10/2020 | ............. | G01C 21/20 |
| WO | WO-2023283102 A1 | * 1/2023 | ............. | H04W 24/08 |

* cited by examiner

*Primary Examiner* — Yuri Kan
(74) *Attorney, Agent, or Firm* — CHIP LAW GROUP

(57) ABSTRACT

An electronic device and a method for path optimization for unmanned aerial system (UAS) is provided. The electronic device includes a memory to store a machine learning model to be trained. The electronic device retrieves a first plurality of parameters related to one or more wireless environments to be utilized by the UAS and generates signal-to-interference-plus-noise ratio (SINR) heatmap information. The electronic device further generates state space information based on the generated SINR heatmap information and trains the machine learning model based on the generated state space information. The trained machine learning model indicates one or more movement based actions to be taken by the UAS at a plurality of states defined in the generated state space information. The electronic device further controls the UAS to travel a predefined path in at least one of the one or more wireless environments based on the trained machine learning model.

20 Claims, 7 Drawing Sheets

700

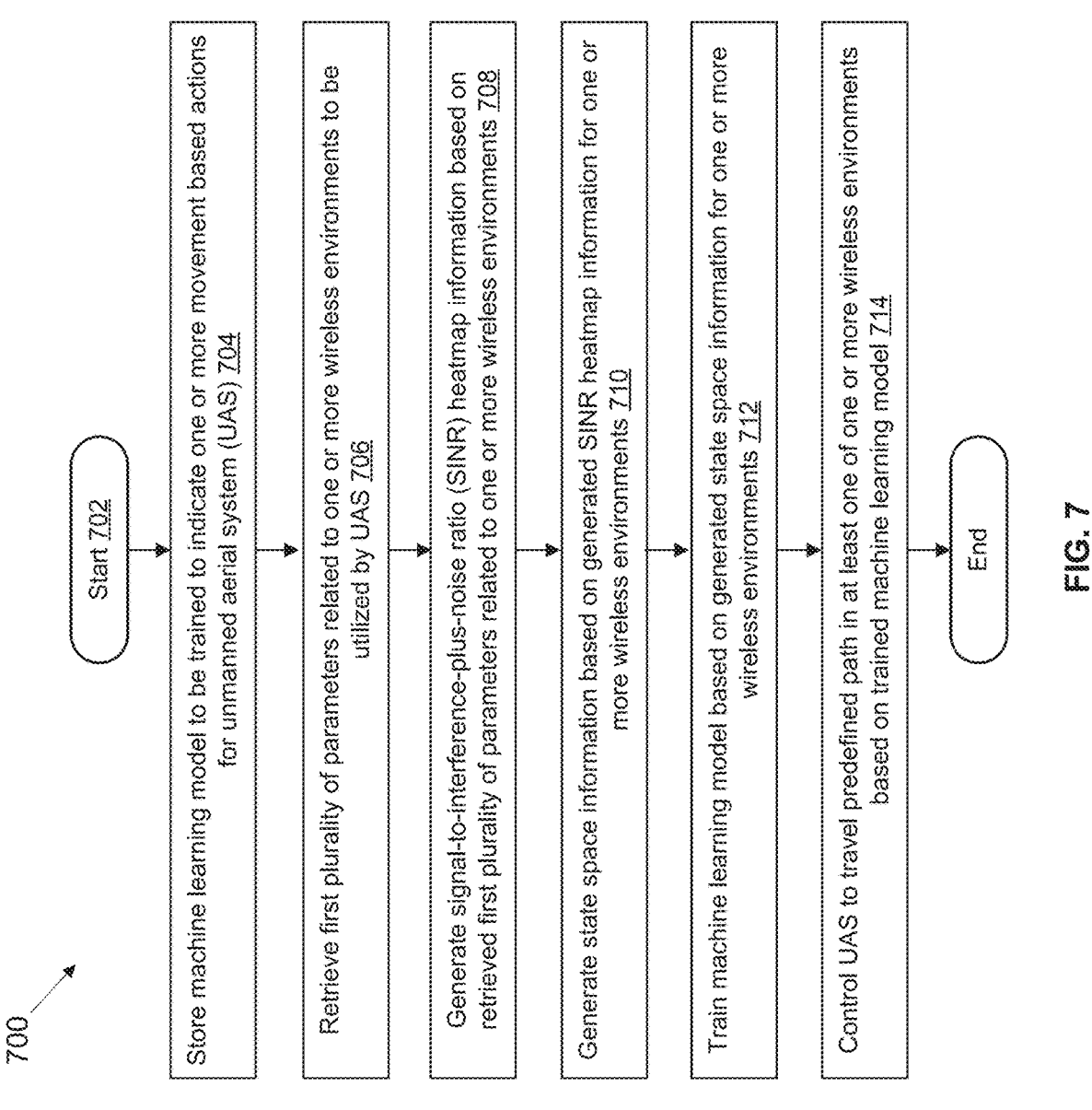

Start 702

Store machine learning model to be trained to indicate one or more movement based actions for unmanned aerial system (UAS) 704

Retrieve first plurality of parameters related to one or more wireless environments to be utilized by UAS 706

Generate signal-to-interference-plus-noise ratio (SINR) heatmap information based on retrieved first plurality of parameters related to one or more wireless environments 708

Generate state space information based on generated SINR heatmap information for one or more wireless environments 710

Train machine learning model based on generated state space information for one or more wireless environments 712

Control UAS to travel predefined path in at least one of one or more wireless environments based on trained machine learning model 714

End

FIG. 7

UNMANNED AERIAL SYSTEM PATH OPTIMIZATION BASED ON MACHINE LEARNING

CROSS-REFERENCE TO RELATED APPLICATIONS/INCORPORATION BY REFERENCE

This application claims priority to U.S. Provisional Patent Application No. 63/509,651 filed on Jun. 22, 2023, the entire content of which is hereby incorporated herein by reference.

FIELD OF TECHNOLOGY

Various embodiments of the disclosure relate to unmanned aerial systems (UAS). More specifically, various embodiments of the disclosure relate to a system and method for optimizing path for unmanned aerial systems (UAS) based on machine learning model.

BACKGROUND

The term drone may be used interchangeably and may be interpreted to comprise an Unmanned Aerial System (UAS) or an Unmanned Aerial vehicle (UAV), or a quadcopter, or a drone or other types of Beyond visual line of sight (BVLOS)-based flying systems. Drones are becoming increasingly popular for a variety of applications, including delivery, surveillance, and photography. Based on the use case, the drones can either be used as an airborne sensor that can capture important data related to infrastructure inspection, mapping, surveillance, etc. or can be used as an airborne base station that serves as a relay between the cellular base station network and geographically remote areas. However, flying drones beyond visual line of sight (BVLOS) can be challenging, as it is difficult to ensure that the drone will stay safe and may follow a desired path. One key challenge to enable drone BVLOS is optimizing the path taken by the drone. This requires the drone to have a path planner that can generate a safe and efficient path for the drone to follow. It is well known that path planning is a complex problem, and currently there is no single way that is best for all situations. The planning of the path for BVLOS drone operations is not straightforward since conventional path planning objectives (such as minimization of flight time or distance traveled) may not be suitable in certain situations. In certain scenarios, drones may need to be able to communicate with ground control stations in order to receive instructions and send back data. This can be challenging in areas with limited coverage.

Currently due to dynamic nature of the wireless channel, there are many open technical challenges for the successful and practical use of drones for operations in a BVLOS environment. In a first example, in a densely populated area or areas with heavy cellular network usage, signal interference can occur due to congested cells, neighboring cells, non-cellular signals, or physical obstacles. This signal interference can result in communication loss or reduced signal-to-interference ratio, affecting drone operations. In a second example, cellular networks have limited coverage areas, and drones operating beyond these coverage areas may experience weak or no network connectivity. The limited range of cellular networks can constrain the operational range of drones, especially in rural or remote areas where network infrastructure is sparse. In a third example, there may be an issue of bandwidth constraints, where drones often require real-time transmission of high-quality video feeds or other data to operators or remote servers. However, cellular networks adapt bandwidth capacities due to changing channel conditions, and the high demand for data transmission from multiple devices can increase network congestion, leading to reduced data rates or latency issues. This can affect the quality and timeliness of the data received from drones. In a fourth example, there is an issue of communication dropouts, where obstacles such as buildings or terrain features can obstruct the signal, resulting in communication dropouts or weak connectivity. For drones flying in complex environments, maintaining sustained BVLOS communications to the cellular base stations can be challenging. In a fifth example, there is another open issue of battery life as drones are typically powered by onboard batteries, and the limited battery life can constrain their operational time. In a cellular environment, drones may need to spend additional energy maintaining wireless connections and actively searching for cellular networks, which can further reduce their overall flight time and operations. In a sixth example, there is another issue of changing atmospheric conditions, where weather related impairments such as wind, rain and temperature changes in the troposphere can affect communications adversely. In yet another example, heterogeneity may be another issue, where different interfaces, radio access technologies (3G, 4G, 5G, or upcoming 6G), computing technologies (e.g., hardware and operating systems) and even one or more carrier networks, are present. Such heterogeneity in wireless communication may further aggravate the challenges in developing a solution that is portable, practical, and upgradable across different environments.

Further limitations and disadvantages of conventional and traditional approaches will become apparent to one of skill in the art, through comparison of such systems with some aspects of the present disclosure as set forth in the remainder of the present application with reference to the drawings.

SUMMARY

A system and a method for implementation of path optimization for a unmanned aerial system (UAS) based on machine learning, are provided substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 7 is a flowchart that illustrates exemplary operations for training a machine learning model for path optimization for an unmanned aerial system (UAS) and further controlling the unmanned aerial system (UAS) based on the trained machine learning model, in accordance with an embodiment of the disclosure.

DETAILED DESCRIPTION

Figure 1:
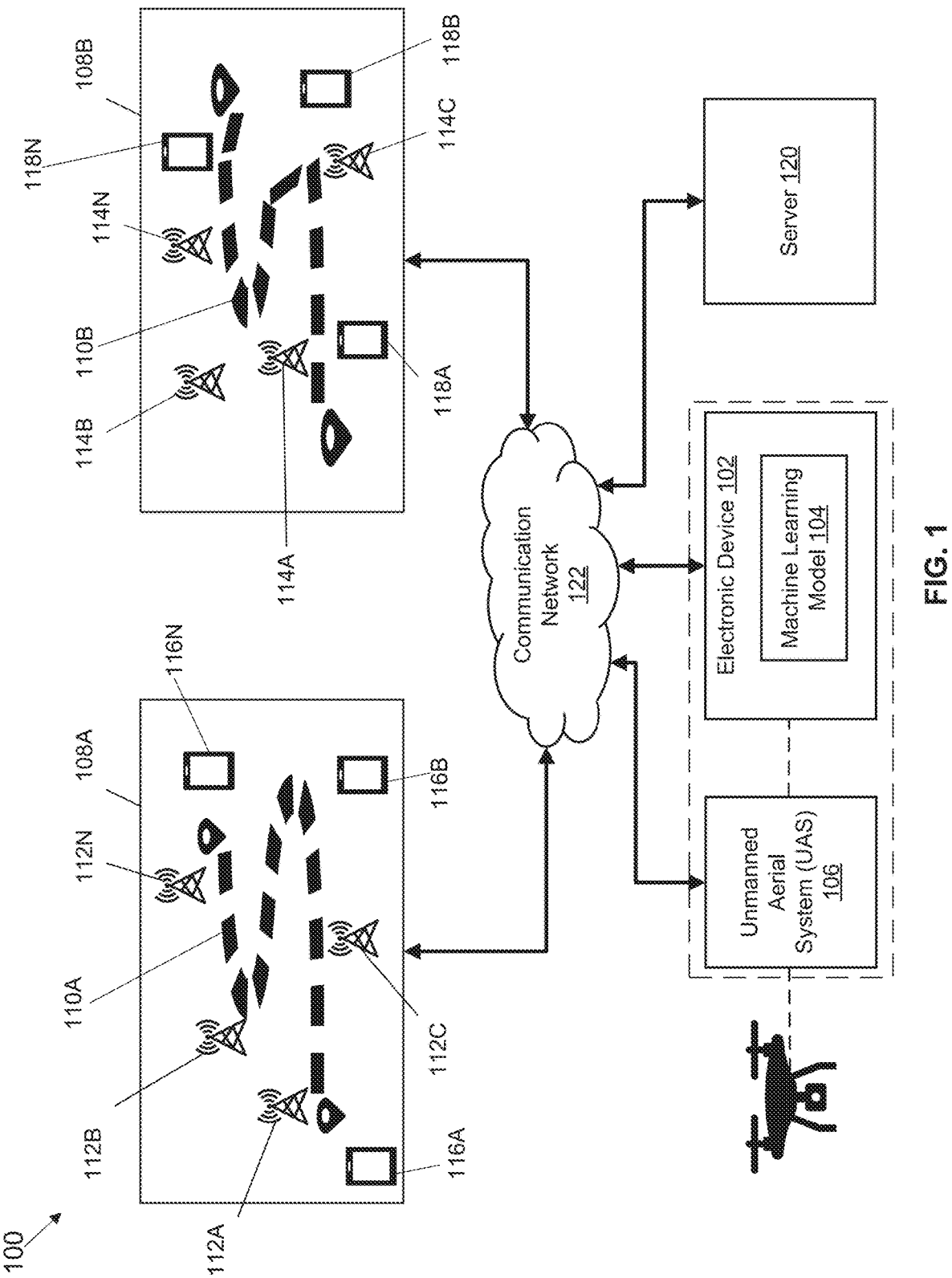
FIG. 1 is a diagram of an exemplary network environment for training a machine learning model for path optimization for an unmanned aerial system (UAS) and further control the unmanned aerial system (UAS) based on the trained machine learning model, in accordance with an embodiment of the disclosure.

The following described implementations may be found in the disclosed electronic device and a method for training a machine learning model (or algorithm) for path optimization of unmanned aerial systems (UAS) for variety of wireless characteristics of different wireless environments where the UAS may travel in future. The training and further control of the UAS based on the trained machine learning model may be performed to achieve goals and maximum rewards for path optimization of the UAS while travelling between different points in a predefined path. Exemplary aspects of the disclosure provide an electronic device that may include a memory to store a machine learning (ML) model that may be exhaustively trained with different wireless characteristics and situations of various wireless environments where unmanned aerial systems (UAS) may travel in future. The trained machine learning model may further control the unmanned aerial system (UAS) to travel a predefined path optimally in different wireless environments, i.e. achieving maximum rewards, achieving predefined goals, maintaining a good connectivity, others. This may further facilitate the UAS to travel safely and efficiently in a variety of conditions.

To train the machine learning model, the electronic device (i.e. control device of the unmanned aerial system (UAS)) may retrieve a first plurality of parameters (for example, but not limited to, base station locations, terrain information, a number of base stations in one or more wireless environments, information about altitudes, interference, and the like) related to one or more wireless environments. The first plurality of parameters may indicate variety of wireless characteristics about the wireless environments through which the unmanned aerial systems (UAS) may travel. The electronic device may further generate a signal-to-interference-plus-noise ratio (SINR) heatmap information based on the retrieve first plurality of SINR values) and further generate state space information for the one or more wireless environments. The SINR heatmap information may indicate a correlation or association between a plurality of SINR values and different locations of the unmanned aerial system (UAS) in different wireless environments. The state SINR heatmap information may further indicate a correlation or association between the plurality of SINR values and different base stations in the different wireless environments which the unmanned aerial system (UAS) may travel.

The disclosed electronic device may further train (for example in offline manner) the machine learning model for the unmanned aerial system (UAS) for different wireless environments based on generated state space information. The trained machine learning model may indicate different movement based actions (like, but not limited to, moving forward, moving backward, turning left, turning right, diagonals, etc.) for different states of the UAS in variety of wireless environments. Such states and movement actions may be defined based on the state space information which may be generated using different wireless characteristics/parameters related to the wireless environments. Using the state space information, the electronic device may be able to generate large amount of training data in the trained machine learning model which may indicate different movement based actions to be taken by the UAS in different states while travelling in different wireless environments. The trained machine learning model may further optimize travel path taken by the UAS based on real-time monitoring of different wireless parameters and current states while travelling a predefined path in a particular wireless environment. Therefore, the electronic device may be further configured to control the UAV to travel the predefined path using the machine learning model well trained on different wireless environments/situations before the actual travel between two points. The path optimization provided by the trained machine learning model may help the UAS to reach the destination safely and efficiently achieving maximum travel goals (for example, but not limited to, minimized travel time, maintaining high SINR and/throughout, minimum energy consumption, minimizing handoffs, and avoiding coverage holes during travel) and rewards in different UAS environment (like even in BVLOS environment).

The disclosed electronic device, using the trained machine learning model, may define how the UAS is to be rewarded for taking different movement based actions defined by the trained machine learning model. The rewards may further encourage the UAS to take actions that lead to the desired outcome/goals. Therefore, the disclosed electronic device may measure reward information based on the control of the UAS while travelling the predefined path and further generate Q-learning information. Q-learning is a reinforcement learning algorithm (also referred to as Q-learning update rule) that may be used to train the machine learning model to further learn how to behave in an environment in order to maximize rewards. The disclosed electronic device may be configured to update the Q-learning information for different state-action pairs based on maximum reward values received by the UAS for taking that action in corresponding state. The machine learning model may be further re-trained based on the updated Q-learning information to accurately define the state-action pairs for the UAS in different wireless environments which may further optimize the travel paths, achieve maximum rewards and effectively attain travel goals (like minimized travel time, high SINR or throughput, minimum energy consumption, or minimized handoffs) in different UAS environments, like BVLOS environment.

FIG. 1 is a diagram of an exemplary network environment for training a machine learning model for path optimization for an unmanned aerial system (UAS) and further control the unmanned aerial system (UAS) based on the trained machine learning model, in accordance with an embodiment of the disclosure. With reference to FIG. 1, there is shown a network environment 100. The network environment 100 may include an electronic device 102 which may further include a machine learning model 104. The network environment 100 may further include an unmanned aerial system (UAS) 106 which may either include the electronic device 102 or may be communicably coupled with the electronic device 102. The network environment 100 may further include one or more wireless environments, for example a first wireless environment 108A and a second wireless environment 108B as shown in FIG. 1. The UAS 106 may travel a predefined path in either or both of the one or more wireless environments. For example, the UAS 106 may move or fly over a first travel path 110A in the first wireless environment 108A or over a second travel path 110B in the second wireless environment 108B. As shown in FIG. 1, the first wireless environment 108A may include a first plurality of base stations, for example, but not limited to, a first base station 112A, a second base station 112B, a third base station 112C, and Nth base station 112N. Similarly, the second wireless environment 108B may include a second plurality of base stations, for example, but not limited to, a first base station 114A, a second base station 114B, a third base station 114C, and Nth base station 114N. The first wireless environment 108A may further include other wireless devices, like a first wireless device 116A, a second wireless device 116B, and Nth wireless device 116N. Similarly, the second wireless environment 108B may further include other wireless devices, like a first wireless device 118A, a second wireless device 118B, and Nth wireless device 118N. The network environment 100 may further include a server 120 and a communication network 122. The electronic device 102, the UAS 106, the first plurality of base stations of the first wireless environment 108A, the second plurality of base stations of the second wireless environment 108B, other wireless devices of each of the first wireless environment 108A and the second wireless environment 108B, and the server 120 may be communicably coupled with each other via, the communication network 122.

In FIG. 1, the electronic device 102 and the UAS 106 are shown as two separate devices; however, in some embodiments, the entire functionality of the UAS 106 may be included in the electronic device 102, without a deviation from scope of the disclosure. The two number of wireless environments (i.e. the first wireless environment 108A and the second wireless environment 108B) shown in FIG. 1 is presented merely as an example. Further, N number of base stations shown in the first wireless environment 108A and the second wireless environment 108B shown in FIG. 1 is presented merely as an example. Each of the wireless environments may include only one or more base stations, without deviation from the scope of the disclosure.

It may be noted here that the positions arrangements, or shapes of the first plurality of base stations and the second plurality of base stations shown in FIG. 1 are presented merely as an example. The present disclosure may be also applicable to other positions, arrangements, or shape of the first plurality of base stations and the second plurality of base stations, without deviation from the scope of the disclosure. Further, it may be noted here that routes indicated in the first travel path 110A and the second travel path 110B in FIG. 1 are presented merely as an example. The present disclosure may be also applicable to other routes (of different shapes, distances, turns, or curves), without deviation from the scope of the disclosure.

The electronic device 102 may comprise a suitable logic, circuitry, interfaces, and/or code that may be configured to train the machine learning model 104 for path optimization for the UAS 106. In an embodiment, the electronic device

102 may be included in the UAS 106. In another embodiment, the electronic device 102 may be communicably coupled with the UAS 106. The electronic device 102 may be configured to retrieve the first plurality of parameters (i.e. wireless characteristics) related to one or more wireless environments (i.e. the first wireless environment 108A and the second wireless environment 108B. The first plurality of parameters are further described, for example, at step 302 in FIG. 3. The electronic device 102 may be further configured to generate signal-to-interference-plus-noise ratio (SINR) heatmap information based on the retrieved first plurality of parameters. The generation of SINR heatmap information is further described, for example, at step 304 in FIG. 3. In some embodiments, the electronic device 102 may include a radio frequency (RF) simulator to generate SINR heatmap information. The electronic device 102 may be further configured to generate the state space information based on the generated SINR heatmap information. The generated state space information is further described, for example, at step 306 in FIG. 3. The electronic device 102 may be further configured to train the machine learning model 104 based on the generated state space information, where the trained machine learning model 104 may indicate different state-action pairs for the UAS 106 for different wireless environments. The training of the machine learning model 104 and the state-action pairs are further described, for example, at step 308 in FIG. 3. Based on the trained machine learning model 104, the electronic device 102 may be further configured to control the UAS 106 to travel a predefined path in the one or more wireless environments. The machine learning model 104 (i.e. trained based on large training data-set of the state-action pairs) may optimize the path for the UAS 106 to travel along the predefined path (i.e. first travel path 110A or the second travel path 110B) by achieving maximized goals in terms of, but not limited to, minimized travel time or distance covered, minimized energy consumption, maximized SINR and throughput, and minimized handoffs. Examples of the electronic device 102 may include, but are not limited to, an unmanned aerial vehicle (UAV) control device, a UAS controller, a computing device, a controller system, a server, an artificial intelligence (AI) device, a neural network system, a mainframe machine, a computer work-station, a smartphone, a cellular phone, a mobile phone, and/or a consumer electronic (CE) device.

The machine learning (ML) model 104 may be a classifier, a regression, or a clustering model which may be (or may need to be) trained to identify a relationship between inputs, such as features in a training dataset and output labels, such as (one or more movement based actions). The machine learning model 104 may be defined by its hyperparameters, for example, number of weights, cost function, input size, number of layers, and the like. The hyperparameters of the machine learning model 104 may be tuned and weights may be updated so as to move towards a global minima of a cost function for the ML model. After several epochs of the training on the feature information in the training dataset, the machine learning model 104 may be trained to output a prediction/classification result for a set of inputs. The prediction result may be indicative of a class label for each input of the set of inputs (e.g., input features extracted from new/unseen instances).

The machine learning model 104 may include electronic data, which may be implemented as, for example, a software component of an application executable on the electronic device 102. The machine learning model 104 may rely on libraries, external scripts, or other logic/instructions for execution by a processing device, such as circuitry 202

Figure 2:
FIG. 2 is a block diagram that illustrates the electronic device of FIG. 1 to train a machine learning model for path optimization for an unmanned aerial system (UAS) and further control the unmanned aerial system (UAS) based on the trained machine learning model, in accordance with an embodiment of the disclosure.
Figure 2:
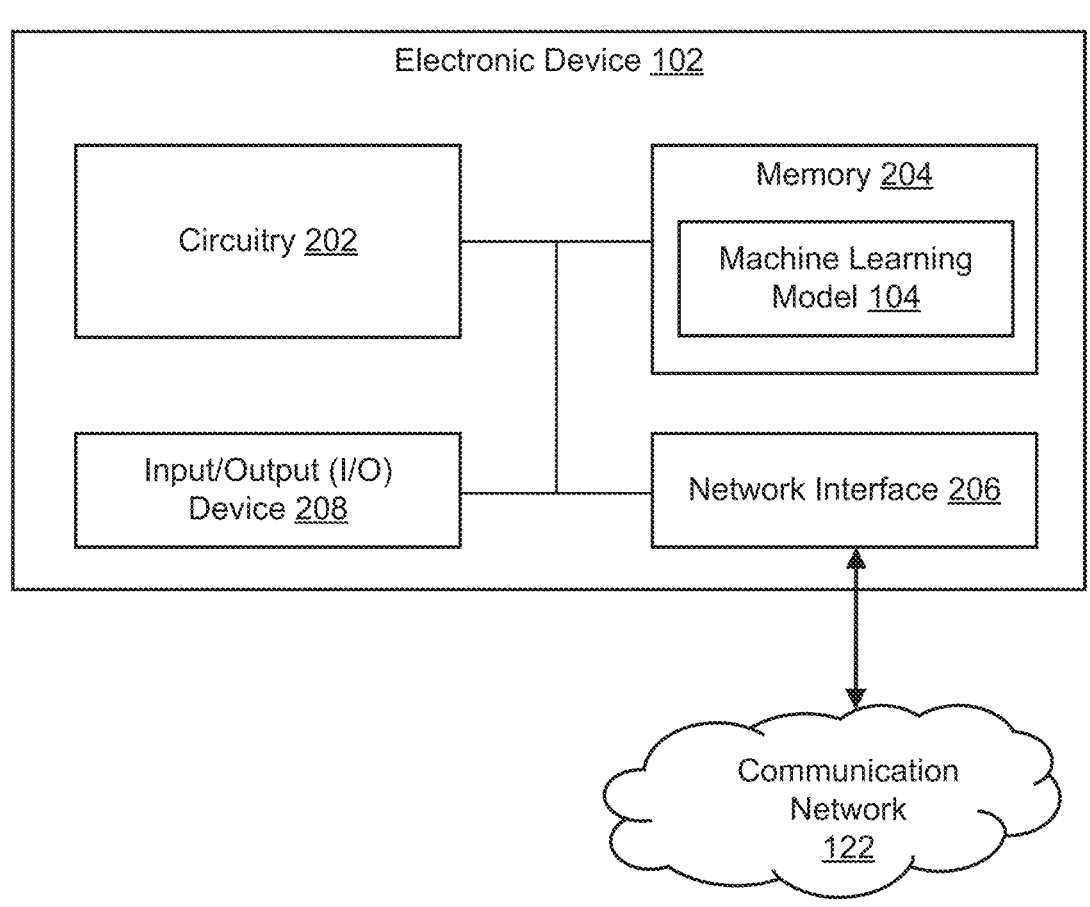

(shown in FIG. 2). The machine learning model 104 may include code and routines configured to enable a computing device, such as the circuitry 202 to perform one or more operations (identify one or move movement based actions based on current state of the unmanned aerial system). Additionally or alternatively, the machine learning model 104 may be implemented using hardware including a processor, a microprocessor (e.g., to perform or control performance of one or more operations), a field-programmable gate array (FPGA), or an application-specific integrated circuit (ASIC). Alternatively, in some embodiments, the machine learning model 104 may be implemented using a combination of hardware and software.

Figure 3:
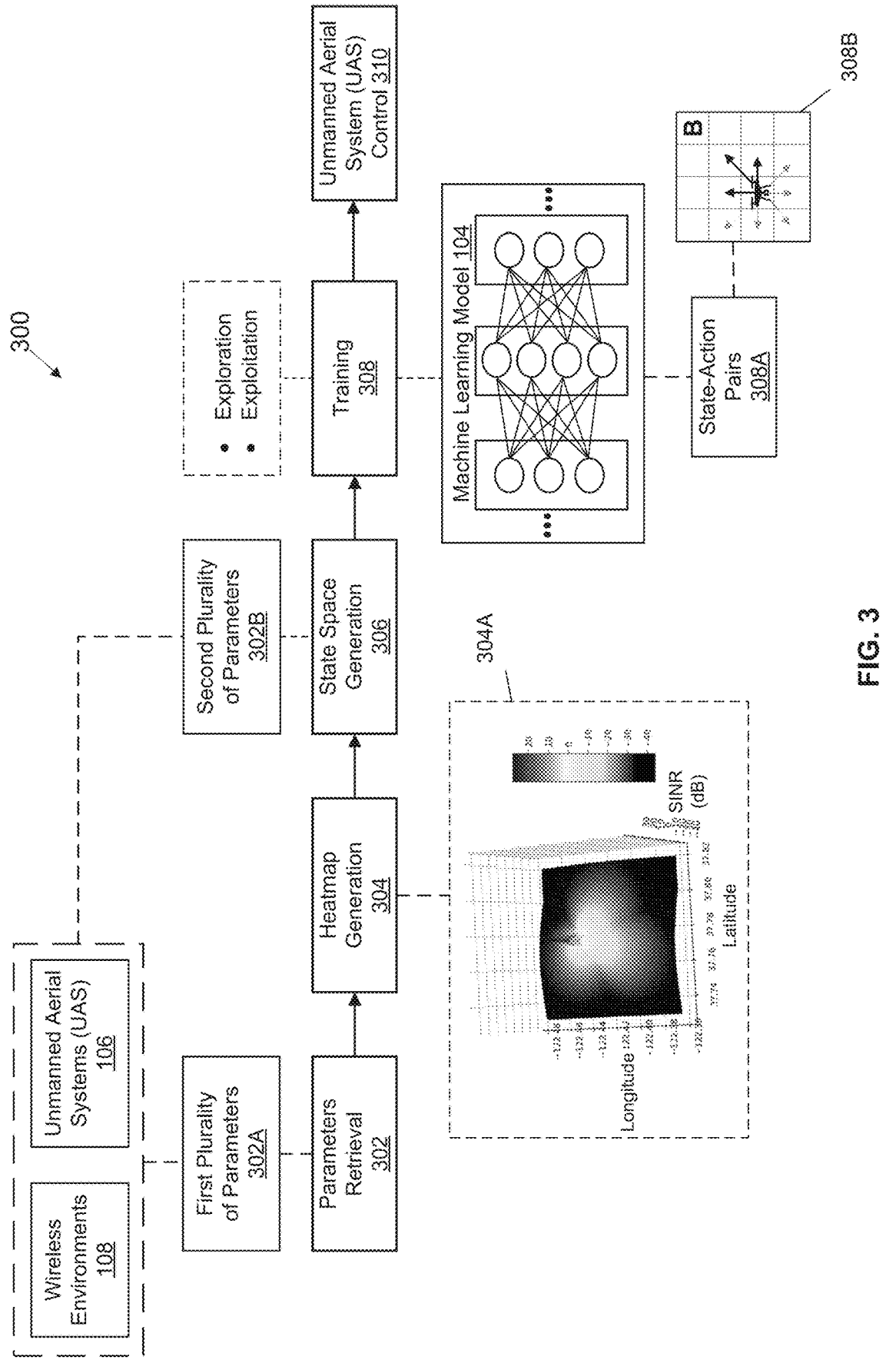
FIG. 3 is a diagram that illustrates exemplary first operations for training a machine learning model for path optimization of an unmanned aerial system (UAS), in accordance with an embodiment of the disclosure.

In an embodiment, the machine learning model 104 may correspond to a neural network. The neural network may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons, represented by circles, for example as shown in FIG. 3). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before, while training, or after training the neural network on a training dataset.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different same mathematical function.

In training of the neural network, one or more parameters of each node of the neural network may be updated based on whether an output of the final layer for a given input (from the training dataset) matches a correct result based on a loss function for the neural network. The above process may be repeated for same or a different input till a minima of loss function may be achieved and a training error may be minimized. Several methods for training are known in art, for example, gradient descent, stochastic gradient descent, batch gradient descent, gradient boost, meta-heuristics, and the like. The details related to the training of the machine learning model 104 by the disclosed electronic device 102 are further described, for example, at step 308, in FIG. 3.

Examples of the neural network may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the learning engine may include numerical computation techniques using data flow graphs. In certain embodiments, the neural network may be based on a hybrid architecture of multiple Deep Neural Networks (DNNs).

The unmanned aerial system (UAS) 106 may comprise suitable logic, circuitry, and/or interfaces that may be an unmanned aerial vehicle, controlled by a remote system or capable of autonomous flights. The unmanned aerial vehicle or system may be controlled by a remote pilot at a ground control station (such as the electronic device 102). The UAS 106 may also fly autonomously (with integrated electronic device 102), based on various pre-programmed flight plans or complex dynamic automation systems. In accordance with an embodiment, the UAS 106 may be configured to receive one or more control instructions from the electronic device 102, via the communication network 122. The one or more control instructions may include information about a 3D position (X-axis, Y-axis, or Z-axis) based on which the UAS 106 moves or flies in a physical 3D space (i.e. the physical 3D space including one or more wireless environments). In some embodiments, the one or more control instructions may include tilt or orientation information. The UAS 106 may control their tilt angle, or orientation based on the tilt or orientation information included in the one or more control instructions received from the electronic device 102. The UAS 106 may control their vertical or horizontal alignment based on the one or more control instructions received from the electronic device 102. In an embodiment, the control instructions may indicate one or more movement based actions provided by the trained machine learning model 104 of the electronic device 102 based on monitored states of the UAS 106 while travelling on the predefined path. In some embodiments, the UAS 106 may communicate with different base stations (for example the first base station 112A in the first wireless environment 108A) or other wireless devices (for example the first wireless device 116A) while travelling the predefined path (i.e. the first travel path 110A or the second travel path 110B). The UAS 106 may communicate with the base stations or with other wireless devices either to maintain connectivity with ground stations, transmit captured data (i.e. like real-time images/video or sensed data), or to receive data/control instructions to move or to fly.

Examples of the UAS 106 may include, but are not limited to, a drone, a smart-plane, or other such aircraft which may be controlled by pre-programmed flight plans and/or automation systems (such as the electronic device 102). In accordance with a frame type and number of motors, various examples of the UAS 106 may include, but are not limited to, a tricopter with three arms and one motor, a quadcopter with four arms and one motor, a hexacopter with six arms and one motor, a Y6 copter with six arms and six motors, an octocopter with eight arms and one motor, and/or an X8 with eight arms and eight motors.

Each of the first plurality of base stations (like the first base station 112A, the second base station 112B) and the second plurality of base stations (like the first base station 114A and the second base station 114B) may comprise suitable logic, circuitry, and/or interfaces that may be configured to communicate with the UAS 106. The communication between the first plurality of base stations (or the second plurality of base stations) and the UAS 106 may provide the wireless connectivity to the UAS 106 while travelling a particular path in either of the first wireless environment 108A or the second wireless environment 108B. The base station may send and receive low or high powered radio signals to and from the UAS 106 (or other wireless devices), and provide the connection to a main telephone network or with the electronic device 102. The UAS 106 may also transmit the captured data to a connected base station or receive the data (or control instructions) from the connected base station. In an embodiment, the connected base station may act as a ground control station for the UAS 106. To provide the consistent connectivity to the UAS 106 throughout the journey of the predefined path, the first plurality of base stations or the second plurality of base stations may conduct handoff of the communication with the UAS 106. In some embodiments, the base station is a fixed transceiver that may act as a communication point between the UAS 106, the electronic device 102, the server 120, and other wireless devices in the one or more wireless environments. In an embodiments, the first plurality of base stations and the second plurality of base stations may be divided into different categories based on cell size or coverage range, for example, but not limited to, macro-cell base station, micro-cell base station, pico-cell base station, or femto-cell base station.

Each of the other wireless devices (for example the first wireless device 116A and the second wireless device 116B in the first wireless environment 108A or the first wireless device 118A and the second wireless device 118B) may comprise suitable logic, circuitry, and/or interfaces that may be configured to communicate with each other for a voice call or to transfer data in different formats, via connected base station. In some embodiments, one of the other wireless devices may communicate with the UAS 106 (to send or receive the data or control instructions) while travelling for a predefined path in at least one of the one or more wireless environments. Examples of the other wireless devices may include, but are not limited to, a smartphone, a cellular phone, a mobile phone, a wireless computing device, a wireless server, or a computer work-station with wireless communication capabilities.

The server 120 may include suitable logic, circuitry, and interfaces, and/or code that may be configured to store the machine learning model 104 trained by the disclosed electronic device 102. The server 120 may be further configured to store the first plurality of parameters and the second plurality of parameters indicating variety of wireless characteristics and situations related to the one or more wireless environments (i.e. the first wireless environment 108A or the second wireless environment 108B). The server 120 may be implemented as a cloud server and may execute operations through web applications, cloud applications, HTTP requests, repository operations, file transfer, and the like. Other example implementations of the server 120 may include, but are not limited to, a database server, a file server, a web server, a media server, an application server, a mainframe server, or a cloud computing server. In at least one embodiment, the server 120 may be implemented as a plurality of distributed cloud-based resources by use of several technologies that are well known to those ordinarily skilled in the art. A person with ordinary skill in the art will understand that the scope of the disclosure may not be limited to the implementation of the server 120 and the electronic device 102 as two separate entities. In certain embodiments, the functionalities of the server 120 can be incorporated in its entirety or at least partially in the electronic device 102, without a departure from the scope of the disclosure.

The communication network 122 may include a communication medium through which the electronic device 102, the UAS 106, the first plurality of base stations of the first wireless environment 108A, the second plurality of base stations of the second wireless environment 108B, other wireless devices of each of the first wireless environment 108A and the second wireless environment 108B, and the server 120 may communicate with each other. The communication network 122 may be one of a wired connection or a wireless connection Examples of the communication network 122 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 122 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, mobile/cellular communication protocols, and Bluetooth (BT) communication protocols.

In some embodiments, the communication network 122 may correspond to a wireless network that may include a medium through which two or more wireless nodes may communicate with each other. Also, the wireless network may include a medium through which the server 120 and/or other network-related devices in the wireless network may provide communication with each other. The wireless network may be established in accordance with Institute of Electrical and Electronics Engineers (IEEE) standards for infrastructure mode (Basic Service Set (BSS) configurations), or in some specific cases, in ad hoc mode (Independent Basic Service Set (IBSS) configurations). The wireless network may be a Wireless Sensor Network (WSN), a Mobile Wireless Sensor Network (MWSN), a wireless ad hoc network, a Mobile Ad-hoc Network (MANET), a Wireless Mesh Network (WMN), a Wide Area Network (WAN), a Wireless Local Area Network (WLAN), a cellular network, a Long Term Evolution (LTE) network, an Evolved High Speed Packet Access (HSPA+), a 3G network, a 4G network, a 5G network, and the like. The wireless network may operate in accordance with IEEE standards, such as 802 wireless standards or a modified protocol, which may include, but are not limited to, 802.3, 802.15.1, 802.16 (Wireless local loop), 802.20 (Mobile Broadband Wireless Access (MBWA)), 802.11-1997 (legacy version), 802.15.4, 802.11a, 802.11b, 802.11 g, 802.11e, 802.11i, 802.11f, 802.11c, 802.11h (specific to European regulations) 802.11n, 802.11j (specific to Japanese regulations), 802.11p, 802.11ac, 802.11ad, 802.11ah, 802.11aj, 802.11ax, 802.11ay, 802.11az, 802.11 hr (high data rate), 802.11af (white space spectrum), 802.11-2007, 802.11-2008, 802.11-2012, 802.11-2016.

FIG. 2 is a block diagram that illustrates an electronic device to train a machine learning model for path optimization for an unmanned aerial system (UAS) and further control the unmanned aerial system (UAS) based on the trained machine learning model, in accordance with an embodiment of the disclosure. FIG. 2 is explained in conjunction with elements from FIG. 1. With reference to FIG. 2, there is shown a block diagram 200 of the electronic device 102 that may be coupled to the base stations of the one or more wireless environments (for example the first plurality of base stations and the second plurality of base stations of the first wireless environment 108A and the second wireless environment 108B respectively), the other wireless devices and the server 120, via the communication network 122. The electronic device 102 may further include circuitry 202, a memory 204, a network interface 206, and an Input/output (I/O) device 208. The memory 204 may be configured to store the machine learning model 104. The electronic device 102 may connect to the communication network 122, via the network interface 206.

The circuitry 202 may include suitable logic, circuitry, interfaces and/or code that may be configured to execute program instructions associated with different operations to be executed by the electronic device 102. For example, some of the operations may include, but not limited to, storage of the machine learning model 104 to be trained, retrieval of the first plurality of parameters related to the one or more wireless environments, generation of the signal-to-interference-plus-noise ratio (SINR) heatmap information, the generation of the state space information, training of the machine learning model 104, and further control of the UAS 106 based on the trained machine learning model. Some of the operations of the electronic device 102 may further include, but not limited to, retrieval of the second plurality of parameters, generation of the reward information, generation and update of the Q-learning information, and re-training of the machine learning model 104.

The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may comprise suitable logic, circuitry, interfaces and/or code that may be configured to store the machine learning model 104. The memory 204 may store the first plurality of parameters and the second plurality of parameters related to the one or more wireless environments. The memory 204 may further store the SINR heatmap information, the state space information, the reward information, and Q-learning information based on the machine learning model 104 may be re-trained. In some embodiments, the memory 204 may store information about the predefined path to be taken by the UAS 106. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, interfaces, and/or code that may be configured to facilitate communication between the server 120, the UAS 106, the first plurality of base stations, the second plurality of base stations, and other wireless devices of the one or more wireless environments, via the communication network 122. The network interface 206 may be implemented by use of various known technologies to support wired or wireless communication of the server 120 with the communication network 122. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 206 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

The I/O device 208 may comprise suitable logic, circuitry, interfaces, and/or code that may be configured to act as an I/O channel/interface between a user (for example an UAS operator, not shown) and the electronic device 102. The I/O device 208 may comprise various input and output devices, which may be configured to communicate with different operational components of the electronic device 102. For example, the I/O device 208 may receive the first plurality of parameters and the second plurality of parameters from the user about the one or more wireless environments (i.e. the first wireless environment 108A and the second wireless environment 108B). Further, the I/O device 208 may output information about the one or more movement based actions to be taken by the UAS 106 based on the current state of the UAS 106 while travelling on the predefined path. Examples of the I/O device 208 may include, but are not limited to, a touch screen, a keyboard, a mouse, a joystick, a microphone, and a display screen. The display screen may be a touch screen which may enable a user to provide a user-input via the display screen. The touch screen may be at least one of a resistive touch screen, a capacitive touch screen, or a thermal touch screen. The display screen may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen may refer to a display screen of a head mounted device (HMD), a smart-glass device, a see-through display, a projection-based display, an electro-chromic display, or a transparent display.

The functions or operations executed by the electronic device 102, as described in FIG. 1, may be performed by the circuitry 202. The operations executed by the circuitry 202 are described in detail, for example, in FIGS. 3-5.

FIG. 3 is a diagram that illustrates exemplary first operations for training a machine learning model for path optimization of an unmanned aerial system (UAS), in accordance with an embodiment of the disclosure. FIG. 3 is explained in conjunction with elements from FIG. 1 and FIG. 2. With reference to FIG. 3, there is shown a block diagram 300. The exemplary operations of the block diagram 300 may be from 302 to 310 and may be performed by any computing system, for example, by the electronic device 102 of FIG. 1 or by the circuitry 202 of FIG. 2.

At 302, parameters may be retrieved. For the retrieval of the wireless parameters, the circuitry 202 may be configured to retrieve a first plurality of parameters (for example a first plurality of parameters 302A shown in FIG. 1). The first plurality of parameters 302A may be retrieved from the memory 204. In some embodiments, the circuitry 202 may retrieve the first plurality of parameters 302A from the server 120. The first plurality of parameters 302A may be related to wireless environments 108 which may also correspond to one or more wireless environments (i.e. the first wireless environment 108A and/or the second wireless environment 108B as shown in FIG. 1). The wireless environments 108 may be an area where the unmanned aerial system (UAS) 106 may travel or fly. Examples of the wireless environments 108 may include, but are not limited to, a path, a street, a town, a district, a city, a province, a mountain area, a desert area, a water body, a geographical physical area, or combination. The wireless environments 108 may include different base stations (for example the first plurality of base stations and the second plurality of base stations shown in FIG. 1) and different other wireless devices (for example the first wireless device 116A and the second wireless device 116B shown in FIG. 1).

The first plurality of parameters 302A may indicate various wireless characteristics of the wireless environments 108 through which the UAS 106 may travel for a predefined path. Therefore, based on the retrieval of the first plurality of parameters 302A, the disclosed electronic device 102 may learn variety of wireless characteristics about the wireless environments through which the UAS 106 may need to travel. The first plurality of parameters 302A (or the wireless characteristics) may be related to the wireless environments 108 or related to different base stations located (or operational) in the wireless environments 108. In some embodiments, the first plurality of parameters 302A may be related to wireless devices currently present in the wireless environments. In another embodiment, the first plurality of parameters 302A may be related the UAS 106 which may travel through one of the wireless environments 108. The circuitry 202 may require the first plurality of parameters 302A to train the machine learning model 104 based on updated/recent information about the UAS 106 and about the wireless environments 108. In some embodiments, the first plurality of parameters 302A may include information about multiple unmanned aerial systems or vehicles for which the machine learning model 104 needs to be trained exhaustively. In an embodiment, the circuitry 202 may be configured to receive at least one of the first plurality of parameters 302A from a particular base station associated with corresponding wireless environment.

The first plurality of parameters 302A may include information about, but is not limited to, locations related to one or more base stations in the one or more wireless environments, a number of the one or more base stations, locations of the UAS related to one or more paths in the one or more wireless environments, a starting location and a destination location of each of the one or more paths, waypoints of the UAS for the one or more paths, antenna beams related to the UAS and related to the one or more base stations, altitudes of the UAS related to the one or more paths, interference in the one or more wireless environments, noise floor in the one or more wireless environments, sectorization of the one or more base stations in the one or more wireless environments, scheduling of the one or more base stations in the one or more wireless environments, a number of other wireless devices in the one or more wireless environments, and locations of the other wireless devices.

Information about locations of the base stations may indicate XY positions of different base stations currently located or operational in corresponding wireless environment. For example, the first plurality of parameters 302A may indicate the XY positions and operational status of the first base station 112A, the second base station 112B, the third base station 112C, and the Nth base station 112N of the first wireless environment 108A shown in FIG. 1, such that the disclosed electronic device 102 may be well aware about the locations of each of the base stations in the wireless environment through which the UAS 106 may be travel on a particular path. The number of the one or more base stations may indicate an actual number of base stations located or functional in a particular wireless environment. For example, as shown in FIG. 1, the first wireless environment 108A include four base stations. The locations of the UAS related to one or more paths may include different XY positions through which the UAS 106 may travel a particular path (for example the first travel path 110A) in a particular wireless environment (like the first wireless environment 108A). The waypoints of the UAS 106 may indicate different points in wireless environments 108 or may be associated with existing navigational aids, intersections, or fixes in the wireless environments 108. The waypoint may indicate a change in direction, speed, or altitude along the desired path for the UAS 106. The information about the antenna beams related to the UAS 106 and the first plurality of base stations (or the second plurality of base stations) may indicate information about antenna gains, sidelobe level, antenna beam widths, antenna pointing directions of the UAS 106 and the base stations in the wireless environments 108.

The information about the altitudes of the UAS 106 may indicate different altitudes which the UAS 106 may achieve at different positions while travelling different paths in different wireless environments 108. Information about the interference may indicate different locations and corresponding interference levels occurring in the wireless environments 108. Interferences may occur due to interfering radio signals provided by different base stations, other wireless devices, or other UAVs travelling at similar timings close to the path of the UAS 106. Information about the noise floor may indicate the noise present in the environment. Typically this may be the thermal noise that may be dependent on the bandwidth and temperature. Typically base stations have 3 antennas, where each serve a 120 degree field of regard. The disclosed electronic device 102 may work with different sectorization that future technologies may use. Such information about the sectorization (like a particular degree field of regard) may be indicated by the information about the sectorization of the one or more base stations. Information about the scheduling of the base stations may indicate algorithms base stations use to allocate resources (bandwidth) to a user equipment.

Information about the number of the other wireless devices may indicate exact number of other wireless devices (like mobile phone) currently available (or functional) or expected to be available/functional in different wireless environments 108. In an embodiment, the information about such number also indicate date-time information of availability in a particular wireless environment for a particular other wireless device. The date-time information may be retrieved based on the schedule of corresponding wireless device, which may be requested either from the corresponding wireless device or from the server 120. The date-time information may help to determine the information about the number of other wireless devices. Information about the locations of the other wireless devices may indicate different XYZ locations of other wireless devices available or functional in different wireless environments 108. Therefore, based on the retrieval of the first plurality of parameters 302A, the disclosed electronic device 102 or the machine learning model 104 may learn variety of real-time characteristics about different UAS (like UAS 106), wireless environments 108, base stations, and other wireless devices present in the corresponding wireless environments 108 before actual travel on the UAS 106.

At 304, heatmap may be generated. The circuitry 202 may be configured to generate signal-to-interference-plus-noise ratio (SINR) heatmap information. The SINR heatmap information may be generated based on at least one of the first plurality of parameters 302A, for example related to the UAS 106 and the base stations in the wireless environment where the UAS 106 needs to travel. The SINR heatmap information may indicate SINR values at different points or locations in the wireless environments 108 or any particular wireless environment which the UAS 106 needs to travel in near future. Such locations may need to be travelled by the UAS 106 for a particular path (such as first travel path 110A in the first wireless environment 108A shown in FIG. 1). The SINR is a measure of the quality of the signal at a given point. A higher SINR indicates a better signal quality. In an embodiment, the electronic device 102 may include a radio frequency (RF) simulator (not shown) to generate the SINR heatmap information. The RF simulator may capture the fundamental trends in the signal power (as SINR values) at the locations or altitudes that the UAS 106 may travel or fly.

In an embodiment, to generate the SINR heatmap information, the circuitry 202 may model the links between the UAS 106 and different base stations at different wireless environments 108. The information about the base stations (like the first plurality of base stations or the second plurality of base stations) in the wireless environments 108 may be included in the first plurality of parameters 302A retrieved at step 302. The circuitry 202 may be configured to, utilize Friis equation, to model the power received by the UAS 106 from the corresponding base stations. The Friis equations is given by equation (1) as follows:

$$Pr = Pt * Gt * Gr * (\lambda/(4 * \pi * R))^2 \qquad (1)$$

where:
Pr is the received power in watts;
Pt is the transmitted power in watts;
Gt is the gain of the transmitting antenna;
Gr is the gain of the receiving antenna;
$\lambda$ is the wavelength of the signal in meters; and
R is the distance between the transmitting and receiving antennas in meters, where R is the distance between UAS and corresponding base station The Friis equation may calculate the power received by an antenna from another antenna that may transmit a known amount of power at a distance under idealized conditions. The Friis equation assumes that the antennas are in free space and that there is no interference from other objects or signals. In practice, there may be some loss due to atmospheric attenuation and other factors. However, the Friis equation may be a good starting point to estimate the received power. The Friis equation may be used to optimize the path taken by the UAS 106 (like a drone) by taking into account different factors that affect the received power. The UAS 106 may also be equipped with antennas with higher gains to increase the received power. By taking these factors into account, it may be possible to improve the performance of UAS communications.

In an embodiment, for each position or location of the UAS 106, the circuitry 202 (or the RF simulator) may be configured to estimate the power received by the UAS 106 from each sector of each individual base station of the wireless environments 108 and further record which base station provided the maximum power (and the corresponding sector). The maximum power may be considered as the received signal, and the powers from all other base stations (each with 3 sectors), as well as the remaining two sectors of the serving base station, may be considered as interference. While making such estimation, the disclosed electronic device 102 may assume that all the base stations (and the three sectors corresponding to each) radiate at the same frequency thereby modeling the worst case scenario. Additionally, the receiver noise of the UAS 106 may be given by equation (2) as follows:

$$PN = \kappa TB \qquad (2)$$

where PN is the noise power,
$\kappa$ is the Boltzmann constant,
T is the receiver noise temperature in Kelvins, and
B is the bandwidth in Hz of the communication signal.
The circuitry 202 may be further configured to calculate the SINR values based on the received maximum power, the interference, and the noise power. For example, the received maximum power may be mathematically divided by the interference and the noise power, to calculate SINR value for each position/location. Therefore, the circuitry 202 may correlate the calculated SINR value with each location of the UAS 106 as well with the corresponding base station that may correspond to the calculated SINR value. Thus, the generated heatmap information may indicate the correlation between a first plurality of SINR values and a plurality of corresponding locations in the wireless environments 108. In another embodiment, the generated SINR heat map may further indicate a correlation between the first plurality of SINR values and a plurality of base stations in the wireless environments 108. Such correlations between the SINR values, UAS positions, and the base stations may facilitate the generation of a representative heatmap (such as heatmap 304A shown in FIG. 3) or the SINR heatmap information, where for every location where the base station corresponding to the maximum SINR changes, there may be handover between the base stations. The handover may occur to provide the wireless connectivity to the UAS 106 with a particular ground station or to keep the UAS 106 connected with an available network in a particular wireless environment.

In an embodiment, the circuitry 202 may be configured to perform interference modeling. The Interference may be caused by other UAS, cellular towers (like base stations), and other wireless devices. It may be important to model the interference in order to ensure that the UAS 106 may communicate reliably while travelling the predefined path in one of the wireless environments 108. There may be a number of different ways to model the interference, for example an interfering signal may be modeled with a Gaussian distribution. The interference magnitude may be modeled with a Rayleigh distribution or Log-normal distribution or Rician distribution. The Gaussian distribution is a probability distribution that is often used to model noise and the interference. The Gaussian distribution is bell-shaped, with a mean and standard deviation. The mean of the distribution represents the expected value of the interference, and the standard deviation represents the spread of the distribution. The Rayleigh distribution is another probability distribution that is often used to model the interference. The Rayleigh distribution is always positive and may represent the magnitude of a complex Gaussian random variable. The mean of the Rayleigh distribution may represent the expected value of the interference, and the standard deviation may represent the spread of the distribution. Further, the log-normal distribution is a probability distribution that may be used to model the interference as well. The log-normal distribution is not bell-shaped, however, it is skewed to the right. The mean of the log-normal distribution may represent the expected value of the logarithm of the interference, and the standard deviation may represent the spread of the distribution. The choice of which distribution to be utilized may depend on a specific application. For instance, the Gaussian distribution may be used for modeling the interference that may be caused by a large number of small sources. The Rayleigh distribution may be used for modeling the interference that is caused by a small number of large sources. Lastly, the log-normal distribution may be used for modeling the interference that is caused by a mixture of small and large sources. Based on selection of the distribution of interference, the probability that the interference will exceed a certain threshold may be calculated. The probability may be used to design a system that can communicate reliably in the presence of interference. In addition to the distributions mentioned above, there may be a number of other distributions that may be used to model the interference. The choice of which distribution to use will depend on the specific application and the desired level of accuracy.

At 306, state space may be generated. In an embodiment, the circuitry 202 may be configured to generate state space information based on the generated SINR heatmap information. To generate the state space information, the circuitry 202 may be configured to retrieve a second plurality of parameters 302B. The second plurality of parameters 302B may be related to one or more wireless environments (for example the wireless environments 108) for which the machine learning model 104 needs to be trained for the path optimization for the UAS 106. The second plurality of parameters 302B may indicate information about, but is not limited to, obstacles (like physical buildings, towers, statues, mountains) in the wireless environments 108, variations in terrains in the wireless environments 108, weather related to the wireless environments 108, flying corridors related to the wireless environments 108, no-fly zones related to the wireless environments 108. In addition to the first plurality of parameters 302A, the second plurality of parameters 302B may be additional detailed information about the wireless environments 108, which the disclosed electronic device 102 may retrieve or know before training the machine learning model 104 for the path optimization of the UAS 106. The circuitry 202 may be configured to retrieve the second plurality of parameters 302B either from the memory 204, or from the server 120 or from a particular base station of the wireless environment, or from a server related to the wireless environment.

Information about different obstacles or variations in the terrains may indicate physical entities which may obstruct the signals received or transmitted by the UAS 106, while travelling a particular path, which may result in communication dropouts or week connectivity with either the ground station, with a particular base station, with other UAV, or with any other wireless device. The information about the weather may indicate different weather conditions at different locations of the wireless environments 108. For example, different weather conditions around each of the base stations may be provided in the information about the weather. For example, the weather conditions near the first base station 112A may be cloudy, the weather conditions near the second base station 112B may be rainy, and the weather conditions near the third base station 112C may be sunny. The information about the weather conditions may inform the disclosed electronic device 102 where exactly (or while communicating with a particular base station), the signals received or transmitted by the UAS 106 may be impacted and may create week connectivity, communication dropouts or data losses due to the weather conditions. Similarly, the information about the flying corridors and no-fly zones in different wireless environments 108 may indicate the disclosed electronic device 102, where the UAS 106 are allowed (or not allowed) while travelling a particular path in a particular wireless environment.

In accordance an embodiment, the second plurality of parameters 302B may make the disclosed electronic device 102 well aware about physical conditions (like, but not limited to, obstacles, terrains variations, climatic conditions, flying corridors, or no-flying zones) of the wireless environments 108. In an embodiment, the circuitry 202 may be configured to add or augment the information about the second plurality of parameters 302B in the generated SINR heatmap information to generate the state space information. As the first plurality of parameters 302A provides the learning of the wireless characteristics of the wireless environments 108, the second plurality of parameters 302B may provide the real-time learning of the physical characteristics (or different situations) about the wireless environments 108 where the UAS 106 may need to travel. Real time knowledge or awareness about the characteristics and physical situations for the wireless environments 108, UAVs, present base stations, and other wireless devices, may facilitate the disclosed electronic device 102 to generate an exhaustive or large training dataset for the training of the machine learning model 104. Such large training dataset may further facilitate the path optimization for the UAS 106 while travelling a predefined path in the wireless environments 108 and achieve maximized goals (i.e. minimized travel time, minimized energy consumption, maximized SINR and throughput, and minimized handoffs) for the path optimization.

In an embodiment, the circuitry 202 may be configured to generate the state space information based on the generated SINR heatmap information. In another embodiment, the circuitry 202 may be configured to generate the state space information based on the generated SINR heatmap information and the second plurality of parameters 302B related to the wireless environments 108. The second plurality of parameters 302B may further augment the generated SINR heatmap information to generate the state space information. Based on the generation of the state space information based on the SINR heatmap information, the state space information may include all possible combinations (i.e., a plurality of different combinations) of the UAV locations and the SINR/throughput values at these locations in the wireless environments 108. Based on the second plurality of parameters 302B, the generated state space information may further include information about different physical conditions/situations related with different combinations of the UAV locations and SINR values at corresponding locations in the wireless environments 108.

In an embodiment, the generated state space information may indicate different states or situations of the UAS 106 while travelling a predefined path in the wireless environments 108. The generated state space information may be referred as the large training dataset (indicating different SINR values at different locations) generated using the first plurality of parameters 302A and the second plurality of parameters 302B about the wireless environments 108. In other words, the generated training dataset may be obtained by defining a 3D space, i.e., defining the environment for the UAS 106 or for multiple UAVs before travelling. The generated training dataset may act as an exhaustive and accurate dataset including the information about the wireless environments 108, base stations, UAVs, other wireless devices, and physical/weather conditions (in form of the second plurality of parameters 302B). Such accurate and exhaustive training dataset may be used to train the machine learning model 104 as described, for example, at step 308.

At 308, the machine learning model 104 may be trained. In an embodiment, the circuitry 202 may be configured to train the machine learning model 104 based on the generated state space information or the training dataset indicated by the state space information. The machine learning model 104 may be trained for one or more unmanned aerial systems to optimally travel in the wireless environments 108. The training of the machine learning model 104 may be referred as reinforcement learning for the UAS 106 for path optimization at operational or deployment stage of the UAS 106. The training process of the machine learning model 104 is described, for example, at FIG. 1. In an embodiment, the trained machine learning model 104 may indicate one or more movement based actions to be taken by the UAS 106 at a plurality of states defined in the generated state space information. In other words, the trained machine learning model 104 may indicate variety of state-action pairs (like state-action pairs 308A shown in FIG. 3) for the UAS 106. The trained machine learning model may indicate which particular action should be taken by the UAS 106 based on a particular state of the UAS 106 measured while travelling a particular path in a particular wireless environment (based on which the machine learning model 104 is trained before travelling). In other words, the machine learning model 104 may be trained so that the UAS 106 may accurately learn how to behave in an environment in order to maximize the rewards or travelling/flying goals. In an embodiment, the one or more movement based actions (for example movement based actions 308B shown in FIG. 3) may include, but are not limited to, move forward, move backward, turn left, and turn right, and moving in a particular diagonal direction. In another embodiments, the one or more movement based actions for the UAS 106 may indicate different amount of changes in one or more of orientations, latitudes, or speed for different states defined in the state space information for the different wireless environments 108.

In the case of UAS path optimization, the environment would be the physical world (like the wireless environments 108) and the reward would be the ability to reach the destination safely and efficiently. In an embodiment, the machine learning model 104 may be trained to provide appropriate or optimal actions to be taken by the UAS 106 at each state which may lead to highest expected rewards during real-time travel. The achieved rewards during the travel and further re-training of the machine learning model 104 based on the rewards are further described, for example, in FIG. 4. The re-training based on the actual rewards achieved at the time of the travel may further increase the accuracy of the machine learning model 104 and of the path optimization performed by the machine learning model 104 of the disclosed electronic device 102.'

The training of the machine learning model 104 before actual travelling of the UAS 106 may indicate that the machine learning model 104 is trained offline using the generated state space information about the wireless environments 108. In other words, the UAS environment may be simulated in an offline environment of the disclosed electronic device 102. The simulation may be used to generate the large amount of training dataset as described, for example, at step 306 above. Such large amount of training dataset (as the state space information) may be used by the machine learning model 104 to learn different combinations of state-action pairs for the UAS 106 to further travel in one of the wireless environments 108 optimally by achieving maximum goals of the path optimization. Therefore, the disclosed electronic device presents a technical solution, which may include generating real-world data in a controlled simulation environment that may take into account several factors that impact a wireless environment. Such offline learning by the machine learning model 104 for variety of wireless environments, may be referred as optimal policy learning for the UAS 106 to travel or fly safely and efficiently in a variety of conditions. Such training of large dataset in form of state-action pair may further enhance the robustness of the UAS 106 (or of the disclosed electronic device 102 to control the UAS 106) before actual deployment to travel the predefined path (such as the first travel path 110A). Further, such exhaustive offline training by the disclosed electronic device 102 before the real-world deployment of the UAS, may facilitate UAS training under safe conditions, without the risk of UAS damages or data loss. Further, such offline training of the machine learning model 104 may reduce the dependency on real-world data (i.e. captured during the actual flight or travel of the UAS) which may further allow the creation of diverse, hypothetical scenarios (using the first plurality of parameters 302A, generation of SINR heatmap information, the second plurality of parameters 302B, the generation of state space information) that might not be encountered in early real-world flights of the unmanned aerial vehicles/systems. Thus, the disclosed electronic device 102 may innovatively and intelligently utilizes simulation-generated data as the training set for machine learning algorithms.

At 310, the UAS 106 may be controlled. In an embodiment, the disclosed electronic device 102 or the circuitry 202 may be further configured to control the UAS 106 based on the machine learning model 104 that is well trained as described at step 308. The control may be performed for the UAS 106 to travel a predefined path (like first travel path 110A) in at least one of the wireless environments 108 for which the machine learning model 104 is trained. During the control the electronic device 102 may be either integrated in the UAS 106 or may be communicably coupled with the UAS 106. The circuitry 202 of the electronic device 102 may provide control instructions to the UAS 106 for the movement along the predefined path based on the trained machine learning model 104. The control of the UAS 106 may correspond to an operational phase of the UAS 106 (i.e. different from a training phase of the machine learning model 104 as described in FIG. 3). In the operational phase, the trained machine learning model 104 may control the UAS 106 to optimize its path in different environment (for example BVLOS environment).

In an embodiment, for the control of the UAS 106 to travel the predefined path (like the first travel path 110A), the circuitry 202 may continuously monitor or determine information about a current state of the UAS 106 while travelling in the first wireless environment 108A. The information about the current state may indicate, but is not limited to, current XY location of the UAS 106, current altitude, current connected base station, received power level or interference, SINR values, current weather information, information about upcoming/nearby flying corridors or no-flying zones, estimated time left to complete the predefined path, or upcoming/nearby obstacles. The circuitry 202 may be configured to determine the current state based on information received from internal sensors (not shown, like GPS sensor, altitude sensor, or environmental sensor) in the UAS 106, or based on real-time measured SINR values, or based on information received from connected base station or from ground station/server/other wireless devices.

Based on the determination of the current state of the UAS 106 while travelling the first travel path 110A, the circuitry 202 may apply the trained machine learning model 104 on the information about the current state of the UAS 106. For the application of the trained machine learning model 104, the machine learning model 104 may infer the state-action pairs based on the determined current state and further determine the corresponding action for the UAS 106. In other words, the circuitry 202 may determine a movement based action from the state-action pairs (for which the machine learning model 104 is trained) based on the application of the machine learning model 104 on the determined current state of the UAS 106.

The movement based action may indicate what real-time action the UAS 106 should take for the current state (like certain location). The UAS 106 may choose the optimal action at each state in the state space in order to reach the destination location safely and efficiently. Examples of the determined movement based action may include, but not limited to, move forward, move backward, move left, move right, move diagonally in a particular direction, increase/decrease altitude, increase speed to particular amount, or change orientation to a particular degree) as described, for example, in step 308 in FIG. 3. Based on the machine learning model 104 trained based on the large training dataset (i.e. state-action pairs defined based on the variety of learning of the wireless environments 108, UAS, base station, physical conditions as described in steps 302-308), the circuitry 202 may be able to effectively determine an appropriate and best movement based action to be taken by the UAS 106 for the optimization of the path and achieve maximized rewards/goals (like minimized travel time, minimized energy consumption, maximized SINR and throughput, and minimized handoffs). In an embodiment, the circuitry 202 may be configured to determine the rewards gained by the UAS 106 while travelling the predefined path based on the trained machine learning model, and further re-training the machine learning model 104 based on information about the gained rewards. Such retraining may further enhance the accuracy of the machine learning model 104 based on the real-time travel situations of the UAS 106 and further facilitate in the improvement of the path optimization to achieve maximum travel goals for the UAS 106 in different environments, like BVLOS environment. The determination of the rewards based on real-time actions taken for different states of the UAS 106, and retraining of the machine learning model 104 to further improve the accuracy of the path optimization is further described, for example, in FIG. 4. In some embodiments, during the training phase, the machine learning model 104 may be trained by supplying a reward signal to the various states that may be expected to be encountered by the UAS 106 in the simulation.

Figure 4:
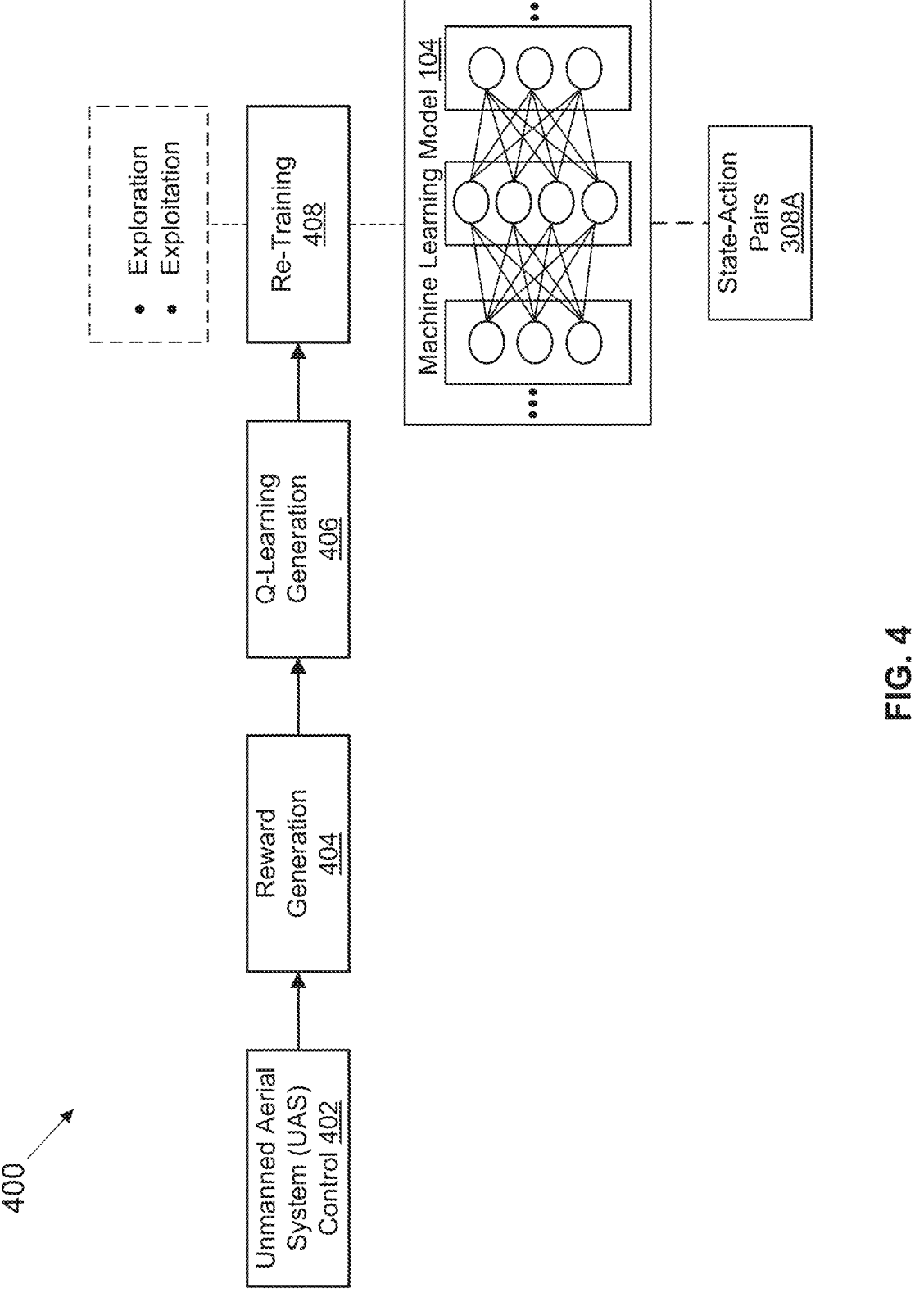
FIG. 4 is a diagram that illustrates exemplary second operations for controlling an unmanned aerial system (UAS) for a predefined path based on trained machine learning model and retraining the machine learning model based on rewards achieved, in accordance with an embodiment of the disclosure.

FIG. 4 is a diagram that illustrates exemplary second operations for controlling an unmanned aerial system (UAS) for a predefined path based on trained machine learning model and retraining the machine learning model based on rewards achieved, in accordance with an embodiment of the disclosure. FIG. 4 is explained in conjunction with elements from FIG. 1, FIG. 2, and FIG. 3. With reference to FIG. 4, there is shown a block diagram 400. The exemplary operations of the block diagram 400 may be from 402 to 408 and may be performed by any computing system, for example, by the electronic device 102 of FIG. 1 or by the circuitry 202 of FIG. 2.

At 402, the UAS 106 may be controlled. In an embodiment, the disclosed electronic device 102 or the circuitry 202 may be further configured to control the UAS 106 to travel the predefined path (like the first travel path 110A) based on the machine learning model 104. The control of the UAS 106 based on the trained machine learning model 104 is described, for example, at step 310 in FIG. 3.

At 404, rewards may be generated. The circuitry 202 of the electronic device 102 may be configured to generate reward information based on the control of the UAS 106 during the travel of the predefined path (like the first travel path 110A). The reward information may be generated based on the one or more movement based actions taken by the UAS 106 for the predefined path. The one or more movement based actions may be suggested by the trained machine learning model 104 based on the current state of the UAS 106 as described for example, at step 310 in FIG. 3. The generated reward information may indicate rewards gained by the UAS 106 to take a particular action (suggested by the machine learning model 104) while travelling the predefined path. In other words, the generated reward information may indicate the rewards gained by the UAS 106 to follow the optimized path i.e. suggested by the trained machine learning model using the suggested state-action pairs. To generate the reward information, the circuitry 202 may define a reward function which may further define how the UAS 106 is to be rewarded for its actions during the predefined path travel. The reward function may be designed to encourage the UAS 106 to take actions that may lead to desired outcome (i.e. goals of route/path optimization). To generate the reward information (i.e. $r_t(p_t)$), the reward function may be given by equation (3) as follows:

$$r_t(p_t) = \tag{3}$$

$$w_1 c_1(p_t, b_1, \ldots, b_{nt}) + w_2 c_2(p_t, t) + w_3 d(p_{t-1}, p_t, p_{end}) + w_4 h(p_{t-1}, p_t)$$

where:
    t is time;
    $w_1$, $w_2$, $w_3$, $w_4$ are real-valued weights;
    $p_t$ is the 3-dimensional (3D) position of the UAS at time t;
    $p_{end}$ is the destination coordinates;
    $c_1$ is the aggregation of SINR values from base stations $b_1, \ldots, b_{nt}$;
    $c_2$ is the current throughput;
    "d" is the distance function; and
    "h" is the handoff function The reward function may be configured for the UAS 106 that may be travelling to reach a destination location of the predefined path while maintaining a good connection to a cellular network. The reward function may be a measure of how well the UAS 106 is performing. The higher the reward, the better the UAS 106 may be performing while the travel. As per equation (3), the reward function may be composed of four terms or components:

$w_1c_1(p_t, b_1, \ldots, b_{nt})$ component of the equation (3) may reward the UAS 106 for flying at locations with good SINR values. SINR is a measure of the signal-to-noise ratio. A higher SINR may indicate that the signal is stronger and the interference/noise is weaker.

$w_2c_2(p_t, t)$ component of the equation (3) may reward the UAS 106 for having a high throughput. Throughput is a measure of the amount of data that may be transferred in a given amount of time. A higher throughput may mean that the UAS 106 may transfer data more quickly.

$w_3d(p_{t-1}, p_t, p_{end})$ component of the equation (3) of the reward function may reward the UAS 106 for moving closer to its destination location.

$w_4h(p_{t-1}, p_t)$—component of the equation (3) of the reward function may reward the UAS 106 for avoiding the handoffs between the base stations. A handoff may occur when the UAS 106 may switch from one base station to another while travelling the predefined path. Handoffs may be disruptive, so it is important to avoid the handoffs whenever possible during the travel.

The weights $w_1$, $w_2$, $w_3$, $w_4$ of the equation (3) may be the real values and may be used to balance the four terms or components in the reward function. The higher the weight, the more important may be the corresponding term. The weights may be adjusted or tuned to change the behavior of the UAS 106. For example, if the goal is to reach the destination as quickly as possible, then the weight of the "d" term may be increased. In case, the reward is to be assigned to the UAS 106 only based on the SINR at certain locations/states, the weight "$w_1$" may be higher than other weights of the equation (3). In the rewards to be assigned based on the joint combination of SINR, handoff, and the distance rewards, the reward for every state may be characterized by three variables—SINR, handoff, and distance. In an embodiment, the electronic device 102 may assign penalties (of certain values) while calculating the reward information every time the base station that provides the UAS 106 the maximum power changes. Further, the distance reward "r(d)" may be defined with equation (4) as follows:

$$r(d) = (d_{previous} - d_{current})^2 \qquad (4)$$

where $d_{current}$ is the Euclidean distance from the UAS current location to the destination, and $d_{previous}$ is the distance from its previous location.

In an embodiment, the reward function may be further used to train or retrain the machine learning model 104 (may also be referred as Q-learning agent), for example, to autonomously control the UAS 106 in the operational or deployment phase. In the retraining, the machine learning model 104 may be given a reward for every action the UAS 106 takes. The machine learning model 104 may learn to take actions that may lead to higher rewards. Over time, based on the rewards or generated reward information, the machine learning model 104 may learn to control the UAS 106 by providing appropriate actions in a way that maximizes the rewards. The retraining based on the rewards are further described, for example, at steps 406 and 408 in FIG. 4.

At 406, Q-learning generation may be performed. In an embodiment, the circuitry 202 may be configured to generate Q-learning information based on the generated reward information. The generated Q-learning information may be related to a movement based action (i.e. referred as first movement based action) suggested by the trained machine learning model 104 based on the current state of the UAS 106. In other words, the first movement based action may be taken by the UAS 106 in a first state during the predefined path. The Q-learning information may be generated for a state-action pair based on the reward received (or reward information generated) for taking that movement based action in corresponding state during the operational phase of the UAS 106. In an embodiment, the circuitry 202 may be configured to update the generated Q-leaning information whenever a maximum reward value (or maximum reward information) may be generated for a particular state action-pair. In other words, the circuitry 202 may be configured to further update the generated Q-learning information based on a maximum reward value of the reward information generated based on the first movement based action taken by the UAS 106 in the first state during the predefined path. The Q-learning information may be updated for the state-action pair based on the reward received for taking that action in that state and the maximum expected future reward from the next state. The Q-learning information update rule is given in equation (5) as follows:

$$\text{New } Q(s, a) = Q'(s, a) + \alpha[(R(s, a) + \gamma \max Q'(s', a') - Q'(s, a)] \qquad (5)$$

where:
New $Q(s, a)$ is the new Q-value for the state-action pair $(s, a)$;
$Q'(s, a)$ is the previous Q-value for the state-action pair $(s, a)$;
$\alpha$ is the learning rate that controls convergence of the machine learning algorithm;
$R(s, a)$ is the reward received for taking action "a" in state "s";
"$\gamma$" is the discount rate or factor that controls how much a future reward impacts the current state;
$s'$ is the next state after taking action "a" in state "s"; and
$a'$ is the optimal action in the state "s"

At 408, the machine learning model 104 may be re-trained. In an embodiment, the circuitry 202 may be configured to re-train the machine learning model 104 based on the Q-learning information updated based on the rewards received during the operational or deployment phase of the UAS 106 for the predefined path. In an embodiment, the machine learning model 104 may be re-trained (one or more times) by repeatedly taking actions in the environment during the predefined path and updating the Q-learning information based on the rewards received for taking the particular action as per state-action pair and/or recommended by the machine learning model 104 for a particular state. The machine learning model 104 may continue to learn until the machine learning model 104 converges to a model that maximizes the expected reward for different state-action pairs, for example, to train UAS to optimize their paths in a variety of environments (even in the BVLOS environments). Therefore, the re-trained machine learning model 104 may indicate the one or more movement based actions which may generate maximum reward values in the reward information during the operational phase of the UAS 106. By this the UAS 106 may be able to optimally travel the predefined path and achieve maximized travel goals of the path optimization. The maximum reward values may indicate minimum travel time taken by the UAS 106 between the starting location and the destination location in the predefined path (like the first travel path 110A in the first wireless environment 108A). The maximum reward values may further indicate SINR values measured during the predefined path, where each of the SINR values may be above a predefined SINR threshold. The SINR values above the predefined SINR threshold may indicate maximum SINR values measured during the predefined path. The maximum reward values may further indicate maximized throughput information measured by the UAS 106 during the predefined path. The maximum reward values may further indicate a minimum number of handoffs between different base stations with the UAS 106 during the predefined path. The balance of such goals (like minimized travel time between starting and destination location, maximized SINR and throughput, and minimized handoffs) may be set by tuning weights, whose values determine their relative importance. The details of the tuning of weights by use of the reward function or the reward information is described, for example, by use of the equation (3) at step 404 in FIG. 4.

The signal strength maximization (e.g., Signal-to-interference-plus-noise ratio (SINR) maximization) may refer to the process of finding the path that may ensure high signal power while simultaneously minimizing noise and interference. There may be a number of factors that may be considered when maximizing SINR. In an example, these factors may include: the distance between the transmitter and the receiver (e.g., distance between UAS 106 and base stations in the particular wireless environment), the antenna gains of the transmitter and the receiver, the path loss between the transmitter and the receiver, the amount of interfering cellular and non-cellular devices, and the ambient background noise, and the thermal noise in the receiver. Throughput maximization may refer to the process of finding the path that may result in the maximum throughput (or data-rate). Further, handoff optimization may refer to the process of finding the best way to transfer communication link from one base station to another. The goal of handoff optimization is to find a way for the UAS 106 to transfer a communication that may minimize the interruption of the communication or minimizes the loss of data. The hand-off goal may include minimizing handoffs and avoiding coverage holes. Minimizing handoffs may be useful because excessive handoffs may cause increased latencies in the communications to/from the UAS 106. Latency issues may be caused by a number of factors, for example, including: the time the UAS 106 may take to transfer the communication from one base-station to another; the loss of data during the transfer of the communication; and the time the UAS 106 may take to re-establish the communication with the new base station. Further, avoiding coverage holes may also useful because the coverage holes may cause communications to be lost. Coverage holes may be caused by a number of factors, including the following: a) obstructions that block the signal from reaching the receiver; b) variations in the terrain that cause the signal to fade; and c) variations in the weather that cause the signal to fade.

The disclosed electronic device 102 may provide a well trained machine learning model 104 based on the awareness of the wireless environments (both wireless and physical characteristics/situations), base stations, UAVs, other wireless device and further improve the accuracy of the machine learning model 104 based on the calculation of the reward information and Q-learning information based on real-time measurement of the states of the UAS 106. The appropriate actions recommended by the trained machine learning model 104 during the deployment phase may optimize the path and facilitate the UAS 106 to achieve maximized travel goals and potentially travel in regions of good coverage.

In accordance with an embodiment, there may be two possibilities while training the machine learning model 104 i.e., Exploration and exploitation. Exploration may correspond to randomly choosing a possible action. The circuitry 202 may be configured to randomly select the first movement based action (i.e. described at step 406) from the one or more movement based actions on which the machine learning model 104 is trained. Exploration may be useful because it may allow the machine learning model 104 to learn about new states and actions. In exploration, the UAS 106 may move in any of 8 different directions as shown, for example, in FIG. 3 (i.e. movement based actions 308B).

On the other hand, exploitation may correspond to choosing the action with highest Q-learning value (i.e. Q-learning information). The circuitry 202 may be configured to select the first movement based action (i.e. described at step 406) from the one or more movement based actions that correspond to a maximum Q-value in the Q-learning information. Exploitation may be useful because it may allow the machine learning model 104 and the UAS 106 (during deployment phase once the training is done) to take actions that are likely to lead to a reward (like with higher reward values). In exploitation, the UAS 106 may be expected to choose among actions leading toward a particular goal (for example "B" goal in the movement based actions 308B shown in FIG. 3). Early in the training, the exploration may dominate, whereas late in the training, the exploitation may dominate. The exploration-exploitation balance may be controlled by hyperparameters epsilon and epsilon_decay_rate. In practice, in a 3D environment, there may be about 26 possible choices as possible actions and 7 choices towards goal.

In accordance with an embodiment, the machine learning model 104 may be trained to use a probabilistic policy to choose between the exploration and the exploitation. A probabilistic policy is a policy that may specify the probability of taking each action. The probability of taking an action may be based on the Q-learning values, the exploration rate, and other factors. The exploration rate may be a hyper parameter that may control the amount of exploration that the UAS 106 does. A higher exploration rate means that the UAS 106 is more likely to explore new states and actions. A lower exploration rate means that the UAS 106 is more likely to exploit its knowledge of the environment. The choice of exploration rate is a trade-off between the exploration and the exploitation. In an embodiment, for the training of the machine learning model 104 (as Q-learning), a state-action function or Q-function may be estimated. The Q-function may be the expected future reward, given the current state and an action. Several hyper-parameters may be used in the model, which may include, but not limited to, a learning rate, a discount rate, an exploration rate, an exploration decay rate, a number of episodes, and a maximum number of actions in an episode.

Figure 5:
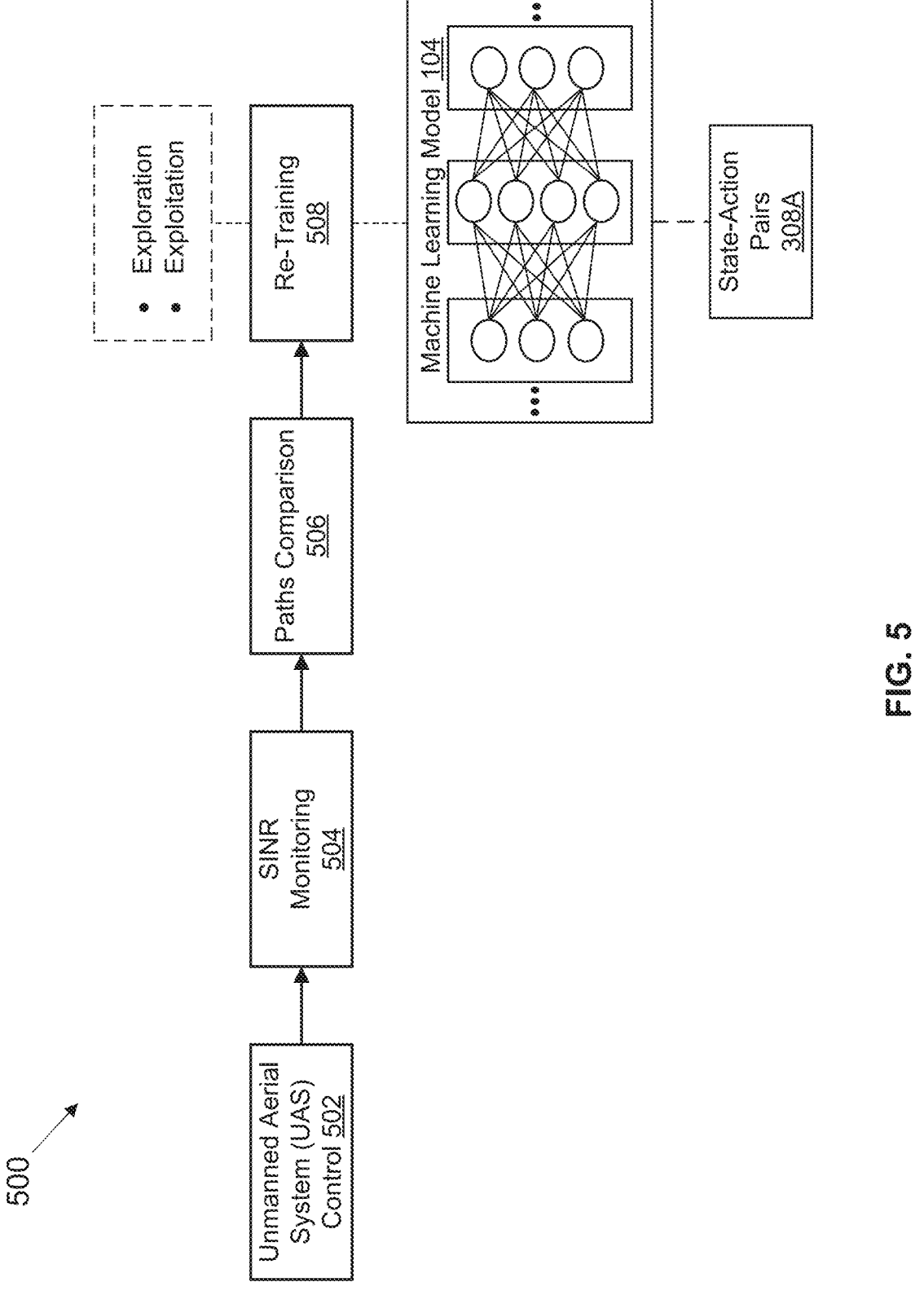
FIG. 5 is a diagram that illustrates exemplary third operations for controlling an unmanned aerial system (UAS) for a predefined path based on trained machine learning model and retraining the machine learning model based on comparison between paths, in accordance with an embodiment of the disclosure.

FIG. 5 is a diagram that illustrates exemplary third operations for controlling an unmanned aerial system (UAS) for a predefined path based on trained machine learning model and retraining the machine learning model based on comparison between paths, in accordance with an embodiment of the disclosure. FIG. 5 is explained in conjunction with elements from FIG. 1, FIG. 2, FIG. 3, and FIG. 4. With reference to FIG. 5, there is shown a block diagram 500. The exemplary operations of the block diagram 500 may be from 502 to 508 and may be performed by any computing system, for example, by the electronic device 102 of FIG. 1 or by the circuitry 202 of FIG. 2.

At 502, the UAS 106 may be controlled. In an embodiment, the disclosed electronic device 102 or the circuitry 202 may be further configured to control the UAS 106 to travel the predefined path (like the first travel path 110A) based on the machine learning model 104. The control of the UAS 106 based on the trained machine learning model 104 is described, for example, at step 310 in FIG. 3.

At 504, SINR values may be monitored. In an embodiment, during the deployment phase of the UAS 106, the circuitry 202 may be configured to regularly monitor the SINR values of the signal received/transmitted by the UAS 106 based on the control of the UAS 106 for the predefined path. The predefined path may be an original path that was defined (between the starting location and destination location) before the start of the deployment phase of the UAS 106. The calculation of the SINR values is described, for example, at step 304 in FIG. 3. The circuitry 202 may be further configured to apply the trained machine learning model on the current states (also indicating SINR values) of the UAS 106 to determine the appropriate actions for the UAS 106 and accordingly optimize the path as described, for example, in FIG. 4.

At 506, paths may be compared. In an embodiment, based on the optimization of the path during the deployment phase of the UAS 106, the circuitry 202 may monitor an actual path (could be an optimized path) taken by the UAS 106 while travelling between the predefined starting and destination locations. The actual path may include a plurality of actual locations or latitudes, or actions taken by the UAS 106 based on the trained machine learning model 104. The circuitry 202 may be further configured to compare the actual path (as optimized path) taken by the UAS 106 with the original predefined path based on the monitored SINR values. For the comparison, the circuitry may compare each location/latitudes of the UAS 106 in the actual path taken by the UAS 106 and original predefined path or may compare the SINR values recorded for both the paths.

At 508, the machine learning model 104 may be re-trained. In an embodiment, the circuitry 202 may be further configured to re-train the machine learning model 104 for one or more wireless environments (i.e. at least one of the wireless environments 108) based on the comparison performed at step 506 in FIG. 5. The comparison may indicate deviations in actions/movements/locations/altitudes of the UAS 106 while following the optimized path. Such comparison may be fed in the trained machine learning model 104 to further improve the accuracy of the machine learning model 104 and accuracy of the path optimization performed by the disclosed electronic device 102 (using the machine learning model 104) for different real-time situations of the wireless environments 108 (for example BVLOS environment). In the re-training, the machine learning model 104 may fine tune the learned state-actions pair based on comparison between the original path taken by the UAS 106 based on suggested actions and the predefined path for the deployment phase.

Figure 6:
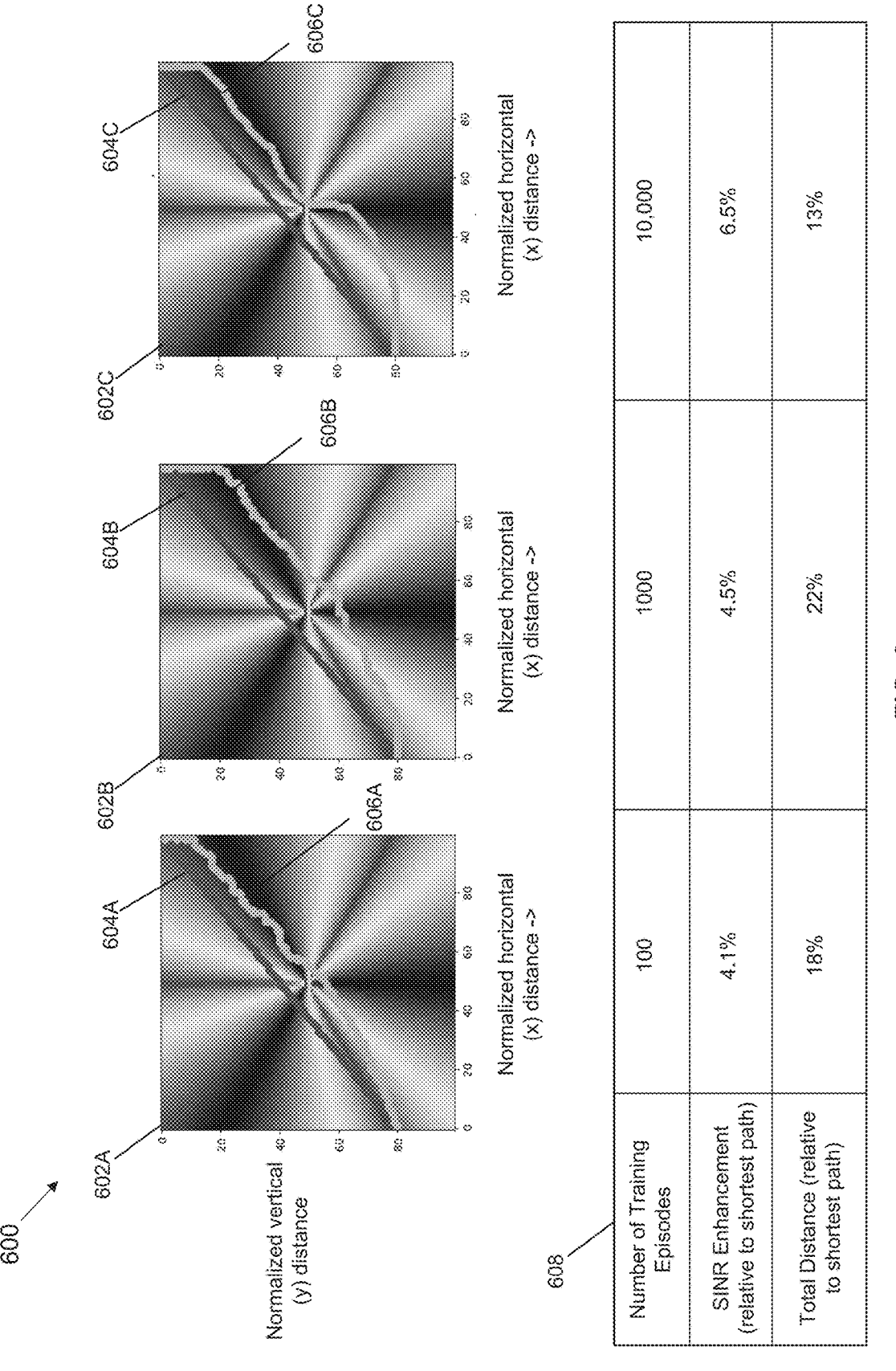
FIG. 6 is a diagram which illustrates experimental results for path optimization using the machine learning model 104, in accordance with an embodiment of the disclosure.

FIG. 6 is a diagram which illustrates experimental results for path optimization using the machine learning model 104, in accordance with an embodiment of the disclosure. FIG. 6 is explained in conjunction with elements from FIG. 1, FIG. 2, FIG. 3, FIG. 4, and FIG. 5. With reference to FIG. 6, there is shown experimental results 600. FIG. 6 shows, for example, training episodes of the machine learning model 104 (e.g., referred as Reinforcement Learning (RL) model or Q-learning agent) to achieve the learning goal. As shown in FIG. 6, the experimental results 600 may illustrate different optimized paths, like a first optimized path 602A, a second optimized path 602B, and a third optimized path 602C. X-axis and Y-axis for each of the first optimized path 602A, the second optimized path 602B, and the third optimized path 602C may correspond to normalized horizontal (x) distance and normalized horizontal (y) distance, respectively, as shown in FIG. 6. All the optimized paths may be determined in terms of SINR optimized path and distance optimized path for different number of training episodes. For example, the first optimized path 602A may include a first distance optimized path 604A and a first SINR optimized path 606A, and may be formed with "100" training episodes as shown in a table 608. The second optimized path 602B may include a second distance optimized path 604B and a second SINR optimized path 606B, and may be formed with "1000" training episodes as shown in a table 608. The third optimized path 602C may include a third distance optimized path 604C and a third SINR optimized path 606C, and may be formed with "10,000" training episodes as shown in a table 608.

As shown in FIG. 6, different training episodes may be used to achieve the learning and optimization goals. The first optimized path 602A may indicate 4.1% SINR enhancement (relative to shortest path) and 18% Total distance (relative to shortest path) with "100" training episodes. The second optimized path 602B may indicate 4.5% SINR enhancement (relative to shortest path) and 22% Total distance (relative to shortest path) with "1000" training episodes. Further, the third optimized path 602C may indicate 6.5% SINR enhancement (relative to shortest path) and 13% Total distance (relative to shortest path) with "10,000" training episodes. The SINR improvement shown in the third optimized path 602C from the first optimized path 602A and the second optimized path 602B indicates the importance of the training with higher number of episodes to achieve optimal path. Similarly, the third optimized path 602C indicates the lowest percentage of total distance (13%) in comparison to the total distances of the first optimized path 602A (i.e. 18%) and the second optimized path 602B (i.e. 22%) as shown in the table 608. As shown in FIG. 6, the disclosed electronic device 102 using the machine learning model 104 may indicate an obvious tradeoff between the SINR and the distance for the path optimization for the unmanned aerial systems.

In another embodiment, the trained machine learning model 104 may reside in variety of environment, for example in the electronic device 102 or in other unmanned aerial systems (for example in the UAS 106). In an embodiment, the offline trained machine learning model 104 may be deployed near real time Intelligent Controller (RT-RIC). In an implementation, an Intelligent Controller (RIC) is a software-defined component of an Open Radio Access Network (Open RAN) architecture that may be responsible for controlling and optimizing RAN functions. The RIC may be divided into non-real-time and near-real-time components. The non-RT RIC is an element of the operator's centralized Service Management and Orchestration (SMO) Framework, as defined by the O-RAN Alliance. The near-RT RIC may reside within a telecommunication edge or regional cloud and typically may enable network optimization actions that may take between 10 milliseconds to one second to complete. The near-RT RIC may further provide policy feedback to the non-RT RIC. Further, the trained machine learning model 104 (or RL model) deployed on the near RT-RAN Intelligent Controller (RIC) may gather data from the base stations.

In another embodiment, the functionalities or portions of the disclosed electronic device 102 (with the trained machine learning model 104) may be deployed at a network edge. This deployment may occur in centralized cloud servers or edge cloud servers, such as a Multi-access Edge Computing (MEC) centralized unit. Multi-access Edge Computing (MEC) is a network solution that may offer users the necessary services and computing functions on edge nodes. By bringing application services and content closer to the users, MEC may enable network collaboration and may enhance user experience by providing reliable and optimal service. In the present case, the user may refer to a drone (like the UAS 106) that may benefit from a software residing on the MEC. This software on the MEC may provide relevant feedback to the UAS 106, which is incorporated into the machine learning inferences for the path/route optimization. The software on the MEC may gather data from the network for the route optimization. In an embodiment, the closer the UAS 106 to the MEC server is, the lower may be the latency.

The disclosed electronic device 102 may perform many other functions or operations, such as 1. Interoperability with different cell technologies, 2. Predictive optimization, 3. Simulation model augmentation, 4. Autonomous multi-UAS swarm scenario, 5. Cross-network handover, and 6. Coupling with real-time weather data.

Interoperability with Different Cell Technologies:

Interoperability with different cellular technologies may ensure that the UAS 106 stays connected irrespective of the underlying technology of the base station. This feature may enable the UAS 106 to seamlessly switch between 4G, 5G, and future cellular technologies. This may further boost the versatility of UAS operations and improves communication efficiency, making the UAS future ready.

Specifically, its advantages include:
    a) Ensures the UAS (like drone) stays connected, irrespective of the cellular technology deployed by the base stations.
    b) Facilitates a seamless transition between 4G, 5G, and upcoming cellular technologies.
    c) Enhances the robustness and versatility of the UAS operations.
    d) Optimizes communication efficiency, regardless of the underlying technology.
    e) Offers future-proof capabilities in anticipation of evolving cellular technologies.
    f) The RL model or algorithm can operate across multiple operators—facilitating roaming.

Predictive Optimization

Predictive optimization may allow the UAS 106 to anticipate future cell coverage areas based on data trends, thereby improving its path planning. The key advantages of predictive optimization are:
    a) The disclosed electronic device 102 may enhance operational efficiency, reliability, and energy conservation. By proactively planning for changes in the cellular network, UAS can maximize throughput and minimize handoffs, ensuring optimal performance.
    b) Enhances the efficiency of the UAS flight path by anticipating future cell coverage areas.

c) Improves the reliability and stability of the UAS communication by avoiding anticipated poor coverage zones.
    d) Enables dynamic path planning for maximum throughput using parameters from the modem (i.e., MCS, CQI etc.).
    e) Minimizes Handoff's between different base stations as the UAS is perceived to be using side-lobes when flying at higher altitudes.
    f) Avoids coverage holes and/or exits coverage holes quickly via continuous learning through machine learning model 104 (i.e. Reinforcement Learning).
    g) Contributes to energy efficiency by planning paths through areas with strong signal strength.
    h) Future-proofs the UAS operations by adapting to evolving network conditions.

Simulation Model Augmentation

The concept of simulation model augmentation involves the integration of real-world data into simulation models, creating a continuous loop of improvement. This unique approach refines the accuracy of the training data for the machine learning model 104, making the machine learning model 104 more effective over time. This may also enable the identification of discrepancies between the simulated and actual environments, ensuring more robust and reliable UAS operations. Specifically its advantages include:
    a) Provides a continuous improvement loop by integrating real-world data into the simulation models.
    b) Enhances the accuracy of the training data and prediction capabilities over time.
    c) Allows for the refinement of machine learning algorithms based on real-world UAS operations.
    d) Facilitates the identification and mitigation of any discrepancies between the simulated and actual environments.
    e) Promotes a comprehensive understanding of the environment, improving decision-making for future flights.

Autonomous Multi-UAS Swarms

Autonomous multi-UAS swarms use the approach of the disclosed electronic device 102 (with the machine learning model 104) to optimize not just individual paths, but group paths across a cell network. This may be an innovative strategy as it allows UAS to act collaboratively, offering redundancy and increasing total throughput. This approach may enhance coverage, data collection capabilities, and task completion efficiency, paving the way for complex, cooperative UAS operations. The key advantages are following:
    a) Enables a group of UAS to operate collaboratively, optimizing group paths across the cell network.
    b) Provides redundancy, ensuring the task completion even if one or more UAS fail.
    c) Increases total throughput by distributing the work among UAS drones.
    d) Facilitates complex tasks that would be challenging for a single UAS.
    e) Enhances coverage and data collection capabilities.
    f) Can be paired with Detect and Avoid systems to reduce chances of UAS colliding with each other.

Cross-Network Handover

Cross-network handover allows the UAS to switch from one cellular network to another type of network like satellite or Wi-Fi when cellular coverage is not optimal. This unique feature may ensure the UAS stays connected under various conditions, enhancing the reliability of UAS communication. This may also provide flexibility for UAS operation across diverse environments, improving data transmission capabilities and drone control. Specific advantages include:

a) Allows the UAS to switch from one cellular network to another network type, like a satellite or WiFi network.

b) The route optimization extends the same efficiencies and benefits to Wi-Fi and Satellite coverages.

c) Ensures continuous connection even in areas with poor or non-existent cellular coverage.

d) Enhances the reliability and stability of the UAS communication.

e) Provides flexibility and versatility in diverse operating environments.

f) Improves data transmission capabilities and UAS control across different networks.

Coupling with Real-Time Weather Data

This involves integrating real-time weather data into the path optimization of the UAS. By considering environmental factors like wind, rain, and temperature, UAS may avoid adverse weather conditions and optimize signal quality. This approach may not only enhance UAS safety but may also contribute to the predictive optimization model, ensuring reliable and efficient drone operations. Key advantages include:

a) Integrates real-time weather data into the path optimization, taking into account factors like wind, rain, and temperature.

b) Enhances flight safety by avoiding adverse weather conditions.

c) Increases the reliability and efficiency of the drone's operations.

d) Ensures optimal communication by avoiding areas where weather could interfere with signal quality.

g) Contributes to the predictive optimization model by incorporating environmental factors.

FIG. 7 is a flowchart that illustrates exemplary operations for training a machine learning model for path optimization for an unmanned aerial system (UAS) and further control the unmanned aerial system (UAS) based on the trained machine learning model, in accordance with an embodiment of the disclosure. FIG. 6 is explained in conjunction with elements from FIG. 1, FIG. 2, FIG. 3, FIG. 4, FIG. 5, and FIG. 6. With reference to FIG. 7, there is shown a flowchart 700. The operations from 702 to 714 may be implemented, for example, by the electronic device 102 of FIG. 2 or the circuitry 202 of FIG. 2. The operations of the flowchart 700 may start at 702 and proceed to 704.

At 704, a machine learning model may be stored. In an embodiment, a memory (like the memory 204) may be configured to store the machine learning model 104 which may be further trained to indicate one or more movement based actions for an unmanned aerial system (UAS), like the UAS 106. The storage of the machine learning model 104 for training is further described, for example, in FIGS. 2 and 3.

At 706, a first plurality of parameters may be retrieved. The first plurality of parameters may be related to one or more wireless environments to be utilized by the UAS. In an embodiment, the circuitry 202 may be configured to retrieve the first plurality of parameters 302A related to the wireless environments 108 as described, for example, in FIG. 3 (at 302). The first plurality of parameters 302A may indicate various wireless characteristics of the wireless environments 108 through which the UAS 106 may travel for a predefined path.

At 708, signal-to-interference-plus-noise ratio (SINR) heatmap information may be generated based on the retrieved first plurality of parameters. In an embodiment, the circuitry 202 may be configured to generate SINR heatmap information based on the retrieved first plurality of parameters 302A which may be related to the wireless environments 108. The generation of the SINR heatmap information is described, for example, in FIG. 3 (at 304). The generated SINR heatmap information may indicate a correlation between a first plurality of SINR values and a plurality of locations in the wireless environments 108.

At 710, state space information may be generated based on the generated SINR heatmap information. In an embodiment, the circuitry 202 may be configured to generate the state space information based on the generated SINR heatmap information for one or more wireless environments as described, for example, in FIG. 3 (at 306).

At 712, the machine learning model may be trained based on the generated state space information. In an embodiment, the circuitry 202 may be configured to train the machine learning model 104 based on the generated state space information for one or more wireless environments. The trained machine learning model 104 may indicate the one or more movement based actions to be taken by the UAS 106 at a plurality of states defined in the generated state space information. The training of the machine learning model 104 is described, for example, in FIG. 3 (at 308). To improve the accuracy of the trained machine learning model and of the path optimization, the machine learning model 104 may be re-trained based on the determination of the rewards, Q-learning information, and comparison of the actual path travel (i.e. optimized path) and the predefined path as described, for example, in FIGS. 4 and 5.

At 714, the UAS may be controlled based on the trained machine learning model 104. In an embodiment, the circuitry 202 may be configured to control the UAS 106 (for example in the deployment phase) based on the trained machine learning model 104 (i.e. trained in the training phase). The UAS 106 may be controlled to travel a predefined path in at least one of wireless environments 108 based on the trained machine learning model 104 as described, for example, in FIG. 3 (at 310) and FIGS. 4 and 5.

Although the flowchart 700 is illustrated as discrete operations, such as 702, 704, 706, 708, 710, 712, and 714, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer instructions executable by a machine and/or a computer to operate an electronic device (for example electronic device 102). The instructions may cause the machine and/or computer to perform operations that may include storage of a machine learning model to be trained to indicate one or more movement based actions for an unmanned aerial system (UAS). The operations may further include retrieval of a first plurality of parameters related to one or more wireless environments to be utilized by the UAS. The operations may further include generation of signal-to-interference-plus-noise ratio (SINR) heatmap information based on the retrieved first plurality of parameters related to the one or more wireless environments. The generated SINR heatmap information may indicate a correlation between a first plurality of SINR values in the generated SINR heatmap information and a plurality of locations in the one or more wireless environments. The operations may further include generation of the state space information based on the generated SINR heatmap information for the one or more wireless environments. The operations may further include training of the machine learning model based on the generated state space information for the one or more wireless environments. The trained machine learning model may indicate the one or more movement based actions to be taken by the UAS at a plurality of states defined in the generated state space information. The operations may further include controlling of the UAS to travel a predefined path in at least one of the one or more wireless environments based on the trained machine learning model.

Exemplary aspects of the disclosure may include an electronic device (for example the electronic device 102). The electronic device 102 may include a memory (for example the memory 204) configured to store a machine learning model (for example the machine learning model 104) to be trained to indicate one or more movement based actions for an unmanned aerial system (UAS) (for example the UAS 106). The electronic device 102 may further include circuitry (for example the circuitry 202) that may be coupled with the memory 204. The circuitry may be configured to retrieve a first plurality of parameters (for example the first plurality of parameters 302A) related to one or more wireless environments (for example the wireless environments 108) to be utilized by the UAS. The circuitry may be configured to generate signal-to-interference-plus-noise ratio (SINR) heatmap information based on the retrieved first plurality of parameters related to the one or more wireless environments. The generated SINR heatmap information may indicate a correlation between a first plurality of SINR values and a plurality of locations in the one or more wireless environments. The generated SINR heatmap information may further indicate a correlation between the first plurality of SINR values and a plurality of base stations in the one or more wireless environments. The circuitry may be further configured to generate state space information based on the generated SINR heatmap information for the one or more wireless environments. The circuitry may be further configured to train the machine learning model based on the generated state space information for the one or more wireless environment. The trained machine learning model may indicate the one or more movement based actions to be taken by the UAS at a plurality of states defined in the generated state space information. The circuitry may be further configured to control the UAS to travel a predefined path in at least one of the one or more wireless environments based on the trained machine learning model.

For the control of the UAS to travel the predefined path, the circuitry may be configured to determine information about a current state of the UAS in the at least one of the one or more wireless environments. The circuitry may be configured to apply the trained machine learning model on the determined information about the current state of the UAS and determine a movement based action, of the one or more movement based actions, for the UAS for the current state based on the application of the trained machine learning model.

The first plurality of parameters may include information about at least one of: locations related to one or more base stations in the one or more wireless environments, a number of the one or more base stations, locations of the UAS related to one or more paths in the one or more wireless environments, a starting location and a destination location of each of the one or more paths, waypoints of the UAS for the one or more paths, antenna beams related to the UAS and related to the one or more base stations, altitudes of the UAS related to the one or more paths, interference in the one or more wireless environments, noise floor in the one or more wireless environments, sectorization of the one or more base stations in the one or more wireless environments, scheduling of the one or more base stations in the one or more wireless environments, a number of wireless devices in the one or more wireless environments, and locations of the other wireless devices.

The circuitry may be further configured to retrieve a second plurality of parameters related to the one or more wireless environments. The second plurality of parameters may include information about at least one of: obstacles in the one or more wireless environments, variations in terrains in the one or more wireless environments, weather related to the one or more wireless environments, flying corridors related to the one or more wireless environments, or no-fly zones related to the one or more wireless environments. The circuitry may be further configured to generate the state space information based on the generated SINR heatmap information and the retrieved second plurality of parameters related to the one or more wireless environments.

The circuitry may be further configured to generate reward information for the UAS based on the control of the UAS to travel the predefined path in the at least one of the one or more wireless environments. The generated reward information may be based on the one or more movement based actions taken by the UAS for the predefined path. The circuitry may be further configured to generate Q-learning information based on the generated reward information. The Q-learning information may be related to a first movement based action taken by the UAS in a first state during the predefined path. The first movement based action may be selected randomly from the one or more movement based actions on which the machine learning model may be trained. The first movement based action may be selected from the one or more movement based actions that correspond to a maximum Q-value in the Q-learning information.

The circuitry may be further configured to update the generated Q-learning information based on a maximum reward value of the reward information, wherein the reward information may be generated based on the first movement based action taken by the UAS in the first state during the predefined path and further re-train the machine learning model based on the updated Q-learning information. The re-trained machine learning model may indicate the one or more movement based actions which generate maximum reward values, including the maximum reward value, in the reward information. The maximum reward values may indicate at least one of minimum travel time taken by the UAS between a starting location and a destination location in the predefined path, SINR values measured during the predefined path, wherein each of the SINR values may be above a predefined SINR threshold, throughput information measured by the UAS during the predefined path, and a number of handoffs between different base stations with the UAS during the predefined path.

The circuitry may be further configured to monitor a second plurality of SINR values based on the control of the UAS for the predefined path. The circuitry may be further configured to compare an actual path taken by the UAS with the predefined path based on the monitored second plurality of SINR values and re-train the machine learning model for the one or more wireless environments based on the comparison.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic device, comprising:
a memory configured to store a machine learning model to be trained to indicate one or more movement based actions for an unmanned aerial system (UAS); and
at least one processor coupled with the memory, wherein the at least one processor is configured to:
retrieve a first plurality of parameters related to one or more wireless environments to be utilized by the UAS;
generate signal-to-interference-plus-noise ratio (SINR) heatmap information based on the retrieved first plurality of parameters related to the one or more wireless environments,
wherein the generated SINR heatmap information indicates a correlation between a first plurality of SINR values in the generated SINR heatmap information and a plurality of locations in the one or more wireless environments;
generate state space information based on the generated SINR heatmap information for the one or more wireless environments;
train the machine learning model based on the generated state space information for the one or more wireless environments, wherein the trained machine learning model indicates the one or more movement based actions to be taken by the UAS at a plurality of states defined in the generated state space information; and
control the UAS to travel a predefined path in at least one of the one or more wireless environments based on the trained machine learning model.

2. The electronic device according to claim 1, wherein for the control of the UAS to travel the predefined path, the at least one processor is further configured to:

determine information about a current state of the UAS in the at least one of the one or more wireless environments;
apply the trained machine learning model on the determined information about the current state of the UAS; and
determine a movement based action, of the one or more movement based actions, for the UAS for the current state based on the application of the trained machine learning model.

3. The electronic device according to claim 1, wherein the first plurality of parameters comprises information about at least one of:
locations related to one or more base stations in the one or more wireless environments,
a number of the one or more base stations,
locations of the UAS related to one or more paths in the one or more wireless environments,
a starting location and a destination location of each of the one or more paths,
waypoints of the UAS for the one or more paths,
antenna beams related to the UAS and related to the one or more base stations,
altitudes of the UAS related to the one or more paths,
interference in the one or more wireless environments,
noise floor in the one or more wireless environments,
sectorization of the one or more base stations in the one or more wireless environments,
scheduling of the one or more base stations in the one or more wireless environments,
a number of wireless devices in the one or more wireless environments, or
locations of the wireless devices.

4. The electronic device according to claim 1, wherein the at least one processor is further configured to:
retrieve a second plurality of parameters related to the one or more wireless environments,
wherein the second plurality of parameters comprises information about at least one of: obstacles in the one or more wireless environments, variations in terrains in the one or more wireless environments, weather related to the one or more wireless environments, flying corridors related to the one or more wireless environments, or no-fly zones related to the one or more wireless environments; and
generate the state space information based on the generated SINR heatmap information and the retrieved second plurality of parameters related to the one or more wireless environments.

5. The electronic device according to claim 1, wherein the generated SINR heatmap information further indicates a correlation between the first plurality of SINR values and a plurality of base stations in the one or more wireless environments.

6. The electronic device according to claim 1, wherein the at least one processor is further configured to:
generate reward information for the UAS based on the control of the UAS to travel the predefined path in the at least one of the one or more wireless environments, and
wherein the generated reward information is based on the one or more movement based actions taken by the UAS for the predefined path.

7. The electronic device according to claim 6, wherein the at least one processor circuitry is further configured to generate Q-learning information based on the generated reward information, and wherein the Q-learning information is related to a first movement based action taken by the UAS in a first state during the predefined path.

8. The electronic device according to claim 7, wherein the first movement based action is selected randomly from the one or more movement based actions on which the machine learning model is trained.

9. The electronic device according to claim 7, wherein the first movement based action is selected from the one or more movement based actions that correspond to a maximum Q-value in the Q-learning information.

10. The electronic device according to claim 7, wherein the at least one processor is further configured to:

update the generated Q-learning information based on a maximum reward value of the reward information, wherein the reward information is generated based on the first movement based action taken by the UAS in the first state during the predefined path; and re-train the machine learning model based on the updated Q-learning information, and wherein the re-trained machine learning model indicates the one or more movement based actions which generate maximum reward values, including the maximum reward value, in the reward information.

11. The electronic device according to claim 10, wherein the maximum reward values indicate at least one of:

minimum travel time taken by the UAS between a starting location and a destination location in the predefined path;

SINR values measured during the predefined path, wherein each of the SINR values is above a predefined SINR threshold;

throughput information measured by the UAS during the predefined path; or a number of handoffs between different base stations with the UAS during the predefined path.

12. The electronic device according to claim 1, wherein the at least one processor is further configured to:

monitor a second plurality of SINR values based on the control of the UAS for the predefined path;

compare an actual path taken by the UAS with the predefined path based on the monitored second plurality of SINR values; and re-train the machine learning model for the one or more wireless environments based on the comparison.

13. A method, comprising:

in an electronic device:

storing a machine learning model to be trained to indicate one or more movement based actions for an unmanned aerial system (UAS);

retrieving a first plurality of parameters related to one or more wireless environments to be utilized by the UAS;

generating signal-to-interference-plus-noise ratio (SINR) heatmap information based on the retrieved first plurality of parameters related to the one or more wireless environments, wherein the generated SINR heatmap information indicates a correlation between a first plurality of SINR values in the generated SINR heatmap information and a plurality of locations in the one or more wireless environments;

generating state space information based on the generated SINR heatmap information for the one or more wireless environments;

training the machine learning model based on the generated state space information for the one or more wireless environments, wherein the trained machine learning model indicates the one or more movement based actions to be taken by the UAS at a plurality of states defined in the generated state space information; and controlling the UAS to travel a predefined path in at least one of the one or more wireless environments based on the trained machine learning model.

14. The method according to claim 13, further comprising:

for the control of the UAS to travel the predefined path:

determining information about a current state of the UAS in the at least one of the one or more wireless environments;

applying the trained machine learning model on the determined information about the current state of the UAS; and determining a movement based action, of the one or more movement based actions, for the UAS for the current state based on the application of the trained machine learning model.

15. The method according to claim 13, further comprising:

retrieving a second plurality of parameters related to the one or more wireless environments, wherein the second plurality of parameters comprises information about at least one of: obstacles in the one or more wireless environments, variations in terrains in the one or more wireless environments, weather related to the one or more wireless environments, flying corridors related to the one or more wireless environments, or no-fly zones related to the one or more wireless environments; and generating the state space information based on the generated SINR heatmap information and the retrieved second plurality of parameters related to the one or more wireless environments.

16. The method according to claim 13, further comprising:

generating reward information for the UAS based on the control of the UAS to travel the predefined path in the at least one of the one or more wireless environments, wherein the generated reward information is based on the one or more movement based actions taken by the UAS for the predefined path.

17. The method according to claim 16, further comprising generating Q-learning information based on the generated reward information, wherein the Q-learning information is related to a first movement based action taken by the UAS in a first state during the predefined path.

18. The method according to claim 17, further comprising:

updating the generated Q-learning information based on a maximum reward value of the reward information, wherein the reward information is generated based on the first movement based action taken by the UAS in the first state during the predefined path; and re-training the machine learning model based on the updated Q-learning information, wherein the re-trained machine learning model indicates the one or more movement based actions which generate maximum reward values in the reward information.

19. The method according to claim 13, further comprising:

monitoring a second plurality of SINR values based on the control of the UAS for the predefined path;

comparing an actual path taken by the UAS with the predefined path based on the monitored second plurality of SINR values; and re-training the machine learning model for the one or more wireless environments based on the comparison.

20. A non-transitory computer-readable medium having stored thereon, computer-executable instructions that when executed by an electronic device, causes the electronic device to execute operations, the operations comprising:

storing a machine learning model to be trained to indicate one or more movement based actions for an unmanned aerial system (UAS);

retrieving a first plurality of parameters related to one or more wireless environments to be utilized by the UAS;

generating signal-to-interference-plus-noise ratio (SINR) heatmap information based on the retrieved first plurality of parameters related to the one or more wireless environments, wherein the generated SINR heatmap information indicates a correlation between a first plurality of SINR values in the generated SINR heatmap information and a plurality of locations in the one or more wireless environments;

generating state space information based on the generated SINR heatmap information for the one or more wireless environments;

training the machine learning model based on the generated state space information for the one or more wireless environments, wherein the trained machine learning model indicates the one or more movement based actions to be taken by the UAS at a plurality of states defined in the generated state space information; and controlling the UAS to travel a predefined path in at least one of the one or more wireless environments based on the trained machine learning model.

* * * * *